US012623105B2

(12) United States Patent
Yu

(10) Patent No.: US 12,623,105 B2
(45) Date of Patent: May 12, 2026

(54) ARTIFICIAL INTELLIGENCE GUIDED FIRE SPRINKLER APPARATUS AND METHOD

(71) Applicant: Simon Siu-Chi Yu, Oakland, CA (US)

(72) Inventor: Simon Siu-Chi Yu, Oakland, CA (US)

( * ) Notice: Subject to any disclaimer, the term of this patent is extended or adjusted under 35 U.S.C. 154(b) by 0 days.

(21) Appl. No.: 19/208,211

(22) Filed: May 14, 2025

(65) Prior Publication Data

US 2025/0332460 A1 Oct. 30, 2025

Related U.S. Application Data

(63) Continuation-in-part of application No. 18/648,248, filed on Apr. 26, 2024, now Pat. No. 12,311,209.

(51) Int. Cl.
*A62C 35/68* (2006.01)
*A62C 35/60* (2006.01)

(52) U.S. Cl.
CPC .............. *A62C 35/68* (2013.01); *A62C 35/60* (2013.01)

(58) Field of Classification Search
CPC ........... A62C 3/006; A62C 3/16; A62C 31/02; A62C 31/28; A62C 35/02; A62C 35/026; A62C 35/11; A62C 35/13; A62C 35/15; A62C 35/60; A62C 35/68; A62C 37/04; A62C 37/11; A62C 37/36; A62C 37/38; A62C 37/40; A62C 37/50
See application file for complete search history.

(56) References Cited

U.S. PATENT DOCUMENTS 3,588,893 A * 6/1971 McCloskey .......... A62C 99/009 340/630
3,866,687 A * 2/1975 Banner ................ A62C 35/605 169/65
5,315,292 A * 5/1994 Prior ...................... A62C 37/38 169/61
5,548,276 A * 8/1996 Thomas ................. A62C 37/38 250/342
5,617,923 A * 4/1997 Nishikubo ............. A62C 35/02 169/11
(Continued)

FOREIGN PATENT DOCUMENTS

CN 112807596 A * 5/2021 ............. A62C 31/28
CN 114681850 B * 4/2023 ............. A62C 31/03
(Continued)

*Primary Examiner* — Darren W Gorman
(74) *Attorney, Agent, or Firm* — Lyman Moulton, Esq.; Moulton Patents, PLLC

(57) ABSTRACT

An artificial intelligence guided, flame tracking fire suppression liquid spray nozzle on a pan and tilt turret base is recessed into a niche of wall mounted fire suppressant tank with a hinged flip door panel. A built-in smoke detector flush with the tank, senses for smoke and in an event fire breaks out, the door panel flips down and drops the pan and tilt turret base to search and lock on and track the flame. The spray nozzle splashes the flame with fire suppressant from its limited volume wall mounted suppressant tank via a high pressure spray pump. The wall tank is backed up to a high volume refill tank located remotely. The system shuts down when the fire is extinguished. Additionally, a hand gesture signal on site or a remote command via Wi-Fi in an emergency provides a fail-safe shutdown to assure premises will not suffer destruction.

15 Claims, 13 Drawing Sheets

(56) References Cited

U.S. PATENT DOCUMENTS

| | | | | | |
|---|---|---|---|---|---|
| 5,632,341 | A * | 5/1997 | Allen | A62C 35/02 169/37 |
| 5,727,634 | A * | 3/1998 | Ishida | A62C 31/05 169/61 |
| 6,975,225 | B2 * | 12/2005 | Privalov | A62C 37/40 340/539.25 |
| 7,066,273 | B2 * | 6/2006 | Tan | A62C 37/40 169/41 |
| 8,607,888 | B2 * | 12/2013 | Nusbaum | A62C 37/36 239/283 |
| 9,155,927 | B2 * | 10/2015 | Newton | A62C 37/40 |
| 10,850,146 | B2 * | 12/2020 | Lee | B05B 3/1035 |
| 2016/0121148 | A1 * | 5/2016 | Al-Hebshi | A62C 35/10 169/61 |
| 2017/0259097 | A1 * | 9/2017 | Orglmeister | A62C 31/28 |
| 2017/0319882 | A1 * | 11/2017 | Hart | A62C 31/03 |
| 2019/0099631 | A1 * | 4/2019 | Hart | A62C 31/28 |
| 2021/0069538 | A1 * | 3/2021 | Magnone | A62C 31/24 |
| 2021/0134131 | A1 * | 5/2021 | Shin | A62C 99/009 |
| 2021/0228926 | A1 * | 7/2021 | Hofmann | A62C 37/04 |
| 2022/0161083 | A1 * | 5/2022 | Bolz-Mendel | A62C 37/40 |
| 2022/0280824 | A1 * | 9/2022 | Muhammad | A62C 37/44 |
| 2022/0305315 | A1 * | 9/2022 | Dusing | A62C 31/28 |
| 2023/0233890 | A1 * | 7/2023 | Chandler | A62C 35/02 340/525 |
| 2024/0115893 | A1 * | 4/2024 | Ruhe | A62C 37/10 |

FOREIGN PATENT DOCUMENTS

| | | | | | |
|---|---|---|---|---|---|
| DE | 102021004290 | A1 * | 2/2023 | A62C 37/10 |
| GB | 2561831 | A * | 10/2018 | G08B 25/08 |
| KR | 20170124387 | A * | 11/2017 | B05B 12/004 |
| KR | 20220159883 | A * | 12/2022 | B05B 13/0421 |
| KR | 102553690 | B1 * | 7/2023 | G06Q 50/10 |
| KR | 20230139416 | A * | 10/2023 | A62C 37/38 |
| WO | WO-2021150600 | A1 * | 7/2021 | A62C 31/05 |

* cited by examiner

Method of extending spray duration via Pulse-Period Modulation

| PPM Pulse-Period Modulation | Spray Duration | Optical Video Camera finding | Spray Pump Volt | Suppressant Pressure | Flow Rate Gallon / min |
|---|---|---|---|---|---|
| | Suppressant consumption | Occupant presence | | Shooting distance | Spray volume |
| Normal operating Voltage 12v | At power up First 2.5 minute | | Steady | 65 psi | 2 |
| 100% | 100% | | 12 v | 25 feet | 5 gal |
| Constant on time Variable frequency | Follow 1 minute | No occupant presence | Pulsation | 65 psi | Reduce to 1.5 |
| | 75% | | 12 v | 25 feet | 1.5 gal |
| on on on 12v Constant on time Variable frequency | At 3.5 minute For 6.5 minute | No occupant presence | Pulsation | 65 psi | Reduce to 0.5 |
| | 25% | | 12 v | 25 feet | 3.25 gal |
| 100% | At anytime Occupant presence | Occupant Recognition confirmed | Steady | 65 psi | 2 |
| | 100% | | 12 v | 25 feet | 5 gal |

Condition: Normally Close valve: In closed position   Check Valve: Open position   Max spray volume: 15 gallon Normal Operating Voltage: 12v

*Fig. 5*

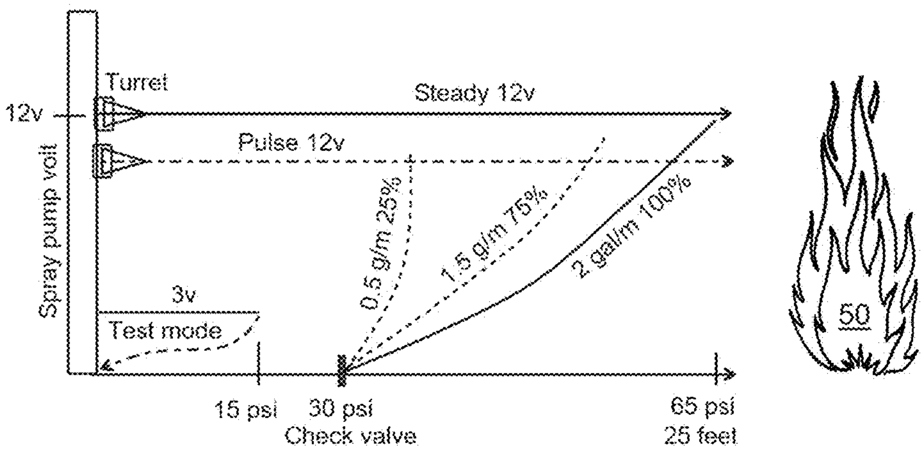

*Fig. 5A*

Fire Suppressant route in self test mode table

| Variable power | Pump Volt | Suppressant Pressure | Check valve | Normally Close valve | Suppressant Direction | Flow Rate Gallon / min |
|---|---|---|---|---|---|---|
| (variable capacitor symbol) | 0-12 v | 0-65 psi | Crack pressure **Set at 30 psi** | Normally close | To Nozzle or return to Tank | 0 - 2 |
| 100% | 12 v | 65 psi | open 65 > 30 | Closed | To spray nozzle | 2 |
| **Self test** 25% | 3 v | 15 psi | **closed** 15 < 30 | **Open** | **Suppressant Return to Tank** | **No spray flow Self test mode** |

*Fig. 17*

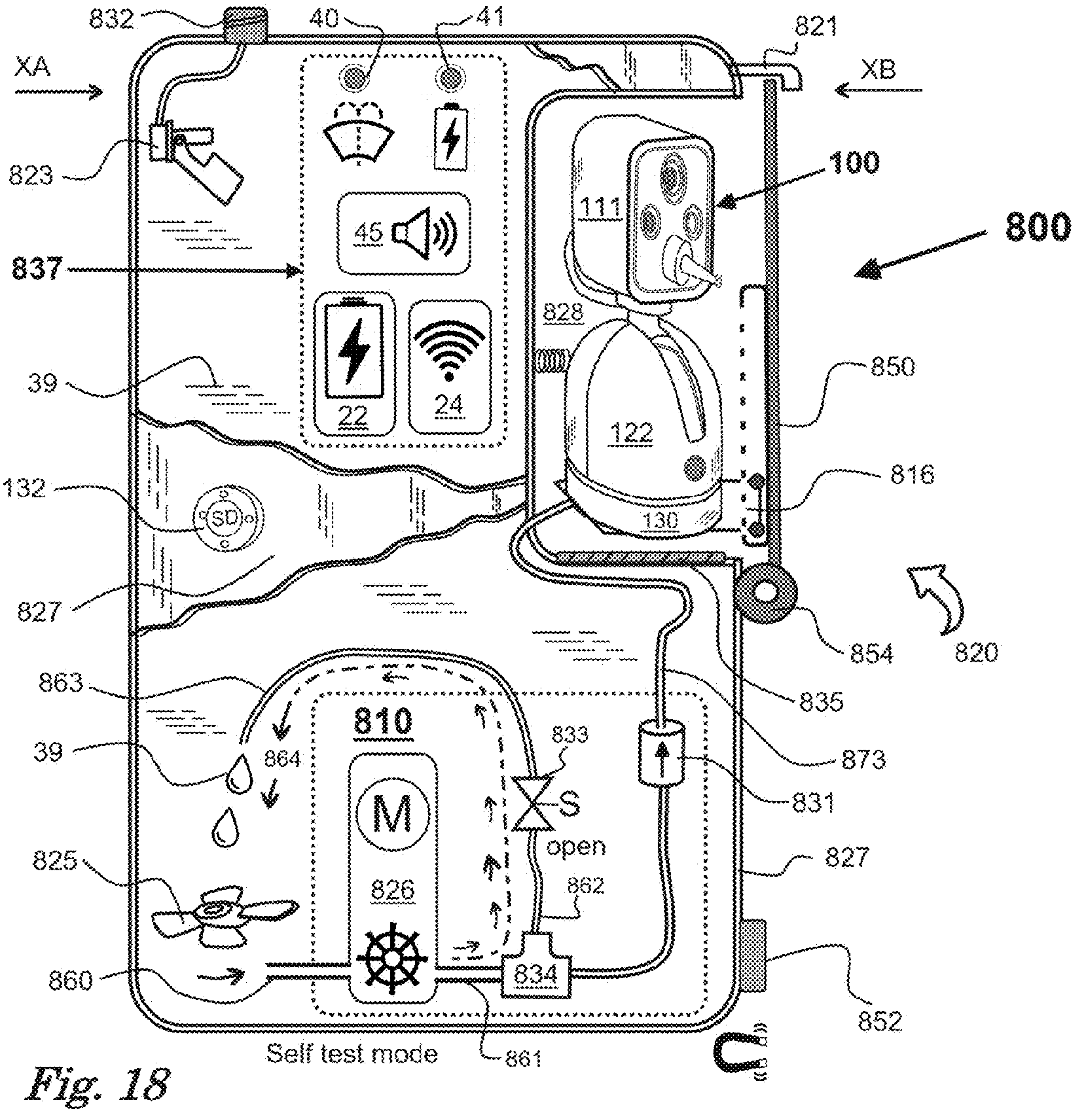

*Fig. 18*

ARTIFICIAL INTELLIGENCE GUIDED FIRE SPRINKLER APPARATUS AND METHOD

CROSS REFERENCE

Applicant files this Continuation In Part and claims priority to the pending non-provisional patent application Ser. No. 18/648,248, filed Apr. 26, 2024 titled Non Destructive Fire Sprinkler System which itself claims priority to the Provisional patent application 63/630,058 filed Dec. 26, 2023 titled Non Property Destructive Fire Sprinkler System for New Home Construction and Existing Home Retrofit by Simon Siu-Chi Yu.

BACKGROUND

The disclosed invention is directed to a multi-purpose and multi-configuration apparatus used for indoor fire fighting for new and existing residential homes and commercial structures. The disclosure is a cost effective alternative for fire safety and prevention over traditional passive fire sprinklers that cause secondary damage due to water and flooding of the affected areas.

When it comes to fire safety and prevention in a home, there is no room for error with other alternatives. It is costly to install a traditional passive system which requires fire department and local city building permits and inspector approval. Each year, house fires cause thousands of civilian deaths, hundreds of thousands are treated for burns resulting in billions of dollars in direct property damage and medical costs. In recent years, many state and local city officials have mandated new residential construction and existing homes install or retrofit automatic fire prevention systems. Installing fire sprinklers in new homes costs tens of thousands of dollars and often cost more in existing homes requiring retrofitting for a better chance of survival when a house catches fire.

Additionally, fire sprinklers installed in a residential home require a much larger water supply feed line increasing the cost. In general, a single family home requires a 1.5 inch water meter to meet the sprinkler flow and water pressure demands cost more than the fire sprinkler installation itself. The legacy water based fire sprinkler system has been the gold standard for centuries because of its proven record. However this traditional fire prevention technology creates massive destruction to property through flooding and pollution and subsequent toxic mold cleanup. Because insurance companies pick up the damage, water damage claims drive up monthly premiums. The present disclosure provides current artificial intelligence technology and is more affordable than what is heretofore available on the market to consumers.

SUMMARY OF THE INVENTION

The present disclosure benefits from years of residential construction over decades including the design and installation of numerous fire sprinkler systems for new homes. Since fire sprinklers provide a comfort and sense of safety for occupants, it is good practice to have a fire sprinkler installed even at a hefty cost. There are numerous considerations in planning a sprinkler system including nearest fire hydrant flow rate and pressure. In some areas which have low pressure will often require an onsite large capacity storage tank with compressed air tank to deliver water for the sprinklers. Periodic testing of each sprinkler for proper function is not possible without heating the heat sensitive glass bulb to 155 degree in Fahrenheit and flooding the premises at 14 gallon per minute rate until someone shuts off the water meter.

When a room catches fire, the traditional passive overhead sprinkler relies on the room temperature to rupture the sprinkler's glass bulb, whereupon it blindly sprinkles water into a room already engulfed in flame. Oftentimes, it is too late to prevent fire damage.

The present disclosure drastically reduces the cost of sprinkler installation and damage compared to the traditional water based fire sprinklers. It does so without the concerns of low water flow and pressure and contaminating sprinkler back flows into domestic water supplies. Installation of the disclosure is as simple as installing a recessed light on a ceiling or mounting an audio sound bar on a wall.

The present disclosure also addresses the personal privacy concern that occupants don't want to be watched on camera in their bedroom. Therefore, when the sprinkler system is not in a deployed position, the disclosure conceals its cameras from open view filming.

The present disclosure makes use of enhanced re-purpose face tracking, object tracking computer vision, machine vision and machine learning software and hardware. The disclosure therefore tracks movement in flame temperature, flame size and flame shape in real time to decide to extinguish a fire before it spreads by directing aqueous fire suppressant precisely on the flame.

The present disclosure works through a novel system of software and residential and commercial wireless communications devices and conventional WiFi connections and controls for a rechargeable battery, fire suppressant, smoke and heat detection sensor, an optical video and a thermal image tracking cameras, MCU (Micro Controller Unit) pan tilt mechanical structure and fire suppressant splashing turret.

Some embodiments have a single turret sprinkler system where initially all components are placed in sleep mode to silence the pan and also tilt servo motors and cameras, except the smoke and heat detection sensor is actively monitoring for heat and smoke in a room. When smoke or heat is detected, it alerts the homeowner or fire dept. via a residential or commercial wireless communications device with conventional Wi-Fi and immediately wakes up all system components causing the pan and tilt mechanical structure that carries the optical video camera, thermal image tracking camera and spray nozzle together searching and tracking for the source of flame. After the flame is located, the thermal image tracking camera determines the size, shape and temperature to determine if a real fire has occurred. Once identified, the spray nozzle splashes the flame with fire suppressant such as Polyphosphate, Ammonium Polyphosphates, Mono ammonium phosphate, Sodium Polyphosphate and the like. The spray nozzle continuously tracks the flame movement, therefore the fire suppressant lands only on the target affected by the flame. After the smoke and heat detection sensor and thermal image tracking camera are no longer alerting smoke or flame exists, the system shuts the spray nozzle off by removing electric power to its high pressure fire suppressant spray pump and its control system then goes into sleep mode again while keeping the smoke and heat detection sensor power on and active all time.

The high pressure fire suppressant spray pump can also be shut down in an emergency by showing a five human's fingers palm gesture as a "STOP" signal recognized by the optical video camera. Subsequently, showing a zero plus three fingers "OK" gesture will signal the spray action to resume. This system of fire prevention preemptively stops a fire as soon as it starts and through human intervention results in dramatically minimizing the damage and increases the chance of survival of human life.

Exemplary components of the object and flame tracking system are open source OV 5640 optical video camera, and Flir Lepton 2 Thermal Sensor Camera on Open MV Pure Thermal board. The optical video and thermal image tracking camera is a combined face-object movement tracking system using a Raspberry Pi Computer board and OpenCV and Pan-Tilt HAT and Python.

BRIEF DESCRIPTION OF THE DRAWINGS

FIG. 5 is a table showing a method to extend spray duration with limited supply of fire suppressant by using Pulse-Period Modulation while provides enough time for occupant escaping from the fire scene in accordance with an embodiment of the present disclosure.

FIG. 5A is a graphic illustration showing Pulse-Period Modulation can maintains maximum pressure and spray distance while reduce suppressant consumption by electronically toggling the fire suppressant spray pump with constant power on time while varying the toggling frequency in accordance with an embodiment of the present disclosure.

FIG. 17 is a table indicating the relationship of using combination of fire suppressant spray pump with a check valve and a normally close electric valve to perform automated fire sprinkler self test system without wetting the premises in accordance with an embodiment of the present disclosure.

FIG. 18 is a cross sectional view of AI guided fire sprinkler system is not in deployed position showing a cut open fire suppressant tank to reveal the components inside its tank in accordance with an embodiment of the present disclosure.

Figure 1:
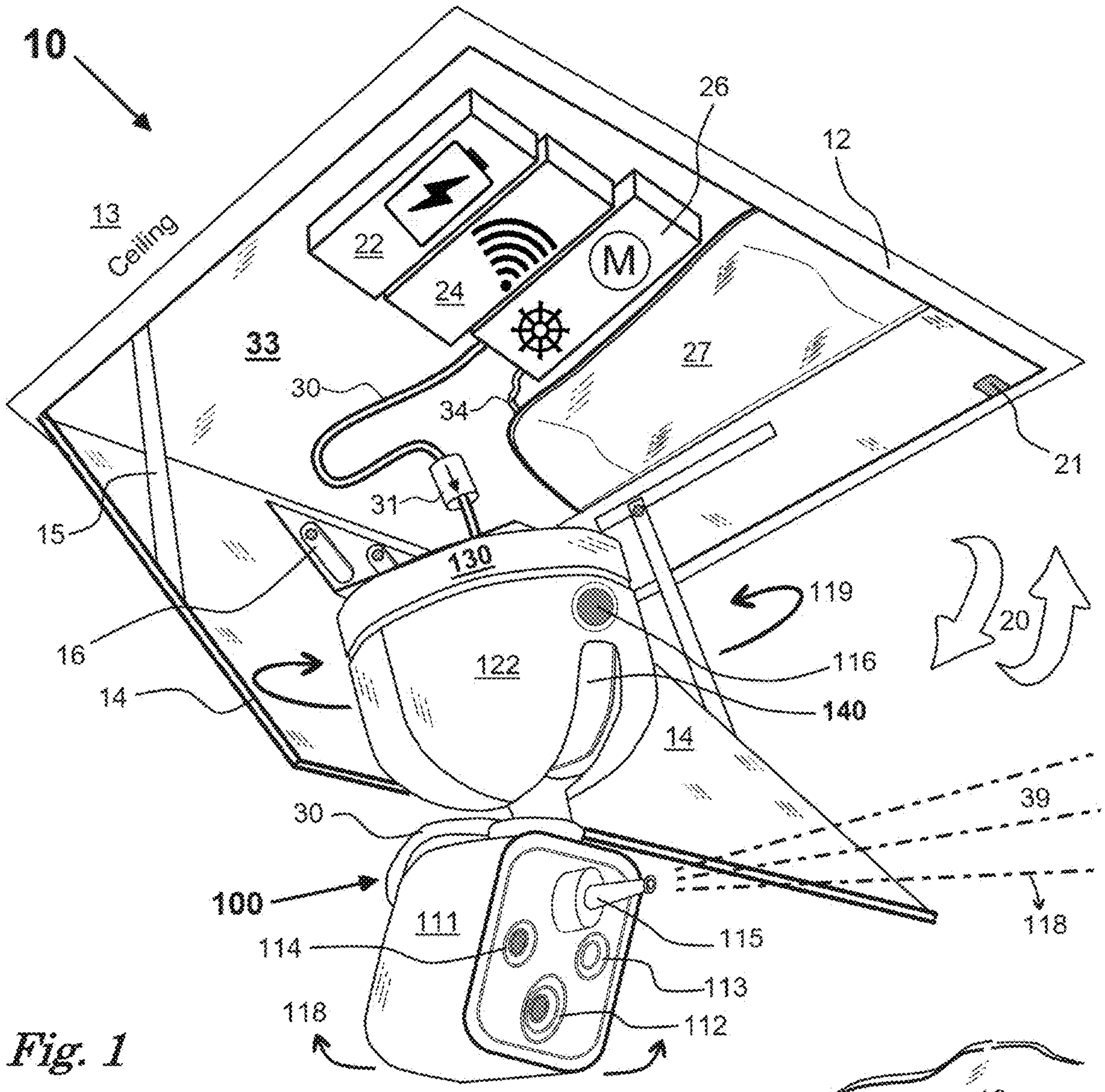
FIG. 1 is the perspective view of a turret configured fire sprinkler recessed into a ceiling cavity for new construction in residential and commercial structures in accordance with an embodiment of the present disclosure.

Throughout the description, similar and same reference numbers may be used to identify similar and same elements in the several embodiments and drawings. Example: The term flame and fire are interchangeable. AI guidance flame tracking turret fire sprinkler and Automated flame tracking turret fire sprinkler are interchangeable. Top off and fill up are interchangeable. Fire sprinkler system and AI guided fire sprinkler system are interchangeable. Anti drip and self test check valve and Check valve are interchangeable. Remotely located external supplemental fire suppressant storage tank and External fire suppressant tank are interchangeable. Human and occupant are interchangeable. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

For understanding the disclosure, referring to FIG. 1 is the flip down concealed behind ceiling turret fire sprinkler system 10 is configured for new and existing home 510. The AI guidance flame tracking turret fire sprinkler 100 is mounted on the interior side (back side) of flip panel 14 with a hinge connected to flip down chassis frame 12 flushes on ceiling board 13. The frame 12 further includes set of slide rails 16 mounted on ceiling mounted flip down hinged door panel 14 supported by panel stop rod or chain 15 to limit the swing of panel 14. The AI guidance flame tracking turret fire sprinkler 100 attached to a set of slide rails 16. A recessed mounted flame resistance can 37 fitted with ceiling rechargeable battery 22, Wi-Fi 24, high pressure fire suppressant spray pump 26 such as a (SHURFLO brand) forces the fire suppressant 39 drawing from ceiling fire suppressant tank 27 via hose 34 and 30 and anti-drip check valve 31 then expelled through fire suppressant spray nozzle 115. A stirring pump 25 and a continuous top-off fluid shutoff valve 23 receiving fill fire suppressant 39 from a remotely located supplemental fire suppressant storage tank 573 through ceiling tank fill inlet 32.

Upon smoke and heat detection sensor 132 detected smokes or heat will alert and wake up the AI guidance flame tracking turret fire sprinkler 100. Since the AI guidance flame tracking turret fire sprinkler 100 is stowed inside ceiling cavity 33. The woke up AI guidance flame tracking turret fire sprinkler 100 sends a release signal to electromechanical release latch 21 flip down the hinged door panel 14 shown in arrow 20, then letting the AI guidance flame tracking turret fire sprinkler 100 slide down shown in arrow 36.

The turret head assembly 111 cleared from the panel 14 in full view of the room and starts searching for a fire 50 with its optical video camera 114 looking for objects and human gesture signal while the thermal image tracking camera 112 searching for a real fire 50 in pan motion 119 and tilt motion 118 through the turret pan servo motor 130 and turret tilt servo motor 140. When the thermal image tracking camera 112 have detected a flame 50 is above 155 degrees in Fahrenheit, the system control and turret pan and tilt MCU 122 activates the pump 26, sending optical photos to the owner or fire department via Wi-Fi 24. The MCU controller 122 keeps tracking the movement of flame 50 guiding the nozzle 115 precisely landing fire suppressant 39 directly on the flame 50. The nozzle 115 blasting the suppressant 39 can reach 25 feet (8 meter) away at 2 gallon (8 liter) per minute and its flow rate and pressure can be adjusted with either PWM (Pulse Width Modulation) or PPM technique (Pulse-Period Modulation).

PWM techniques can reduce voltage level to the spray pump 826 shown in FIG. 17 in turn lowering the fire suppressant 39 pressure and shortening shooting distance which is ideal for automated fire sprinkler self test purpose. On the other hand, PPM techniques maintain maximum fire suppressant 39 pressures and shooting range in pulsation fashion offers extending the spray duration by reducing fire suppressant 39 consumptions in a safe manner. The laser distance sensor 113 and the optical video camera 114 and the illuminator 116 determine which modulation method to be used to optimize the efficacy of extinguishing a fire 50. Turning to FIG. 1A is the exterior side (front surface) of flip panel 14 shows a smoke and heat detection sensor 132 installed on panel 14 and alert warning indicator LED 40 when ceiling tank 27 suppressant is low and indicator LED

41 when battery is low and audio sounder warning signal 45 for the system needs maintenance.

Figure 1B:
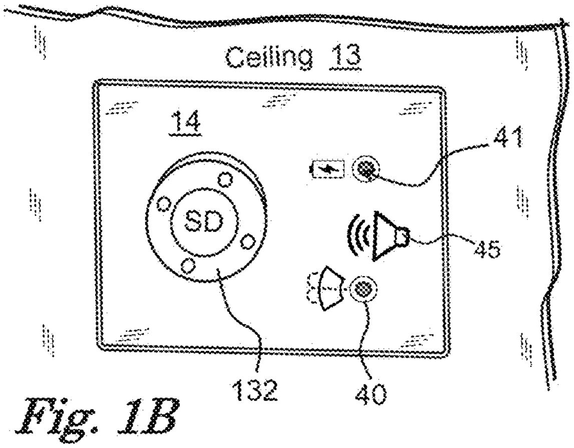
FIG. 1B is the perspective view of a turret configured fire sprinkler panel pushed back in a hide-away closed non deployed position in accordance with an embodiment of the present disclosure.
Figure 1A:
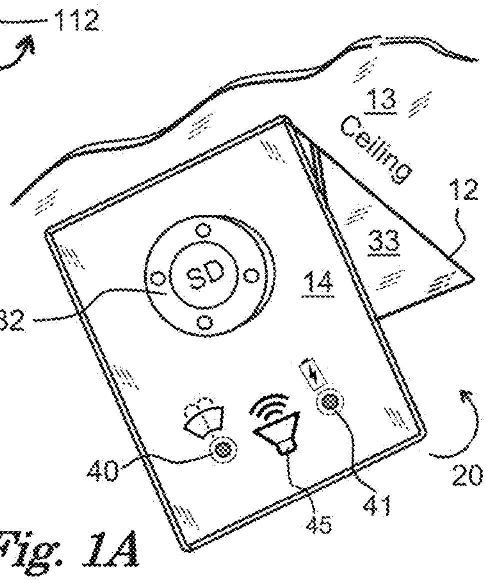
FIG. 1A is the perspective view of a turret configured fire sprinkler panel popped open in accordance with an embodiment of the present disclosure.
Figure 2:
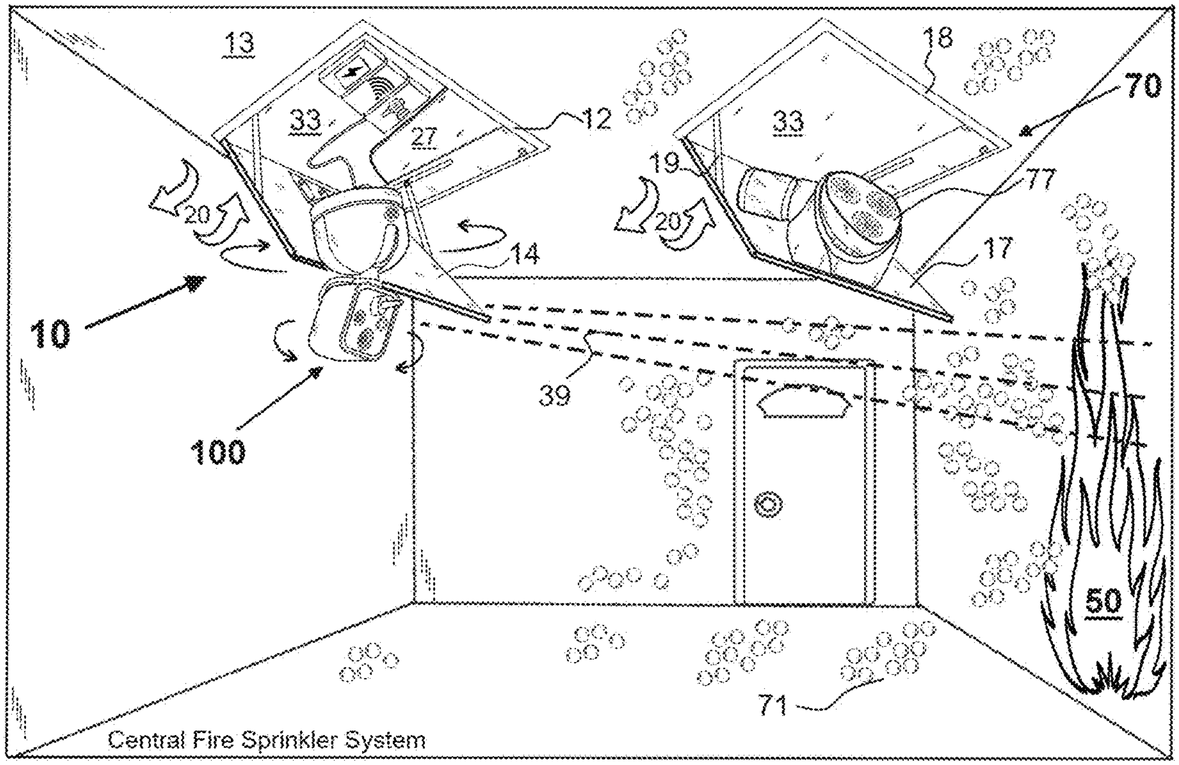
FIG. 2 is an illustration of a new construction home installed with a turret fire sprinkler and combined with a bubble generator module to speedily extinguish a fire in accordance with an embodiment of the present disclosure.

FIG. 1B the AI guidance flame tracking turret fire sprinkler 100 is in a stowed position after the smoke detector no longer detects smoke. The panel 14 flushes with the ceiling board 13. Turning to FIG. 2 is a central fire sprinkler system utilizing flip down concealed ceiling turret fire system 10 installed on ceiling board 13 is in deployed and in operation position. The turret head assembly 111 can rotate 360 degrees and it tilts 180 degrees with the turret head assembly 111 carries the fire suppression nozzle 115 covers the room area within 25 feet radius.

Also notice the bubble generator module 70 installed on the frame 18 with a hinged flip down panel 17. The panel 17 flip down indicates by arrow 20, panel 17 opening is set by the stop rod or chain 19. When both of the AI guidance flame tracking turret fire sprinkler 100 spray suppressant 39 and the bubble generator 77 blowing fire suppressant added bubbles 71 are in operation to help speed up extinguish the fire 50.

Figure 3:
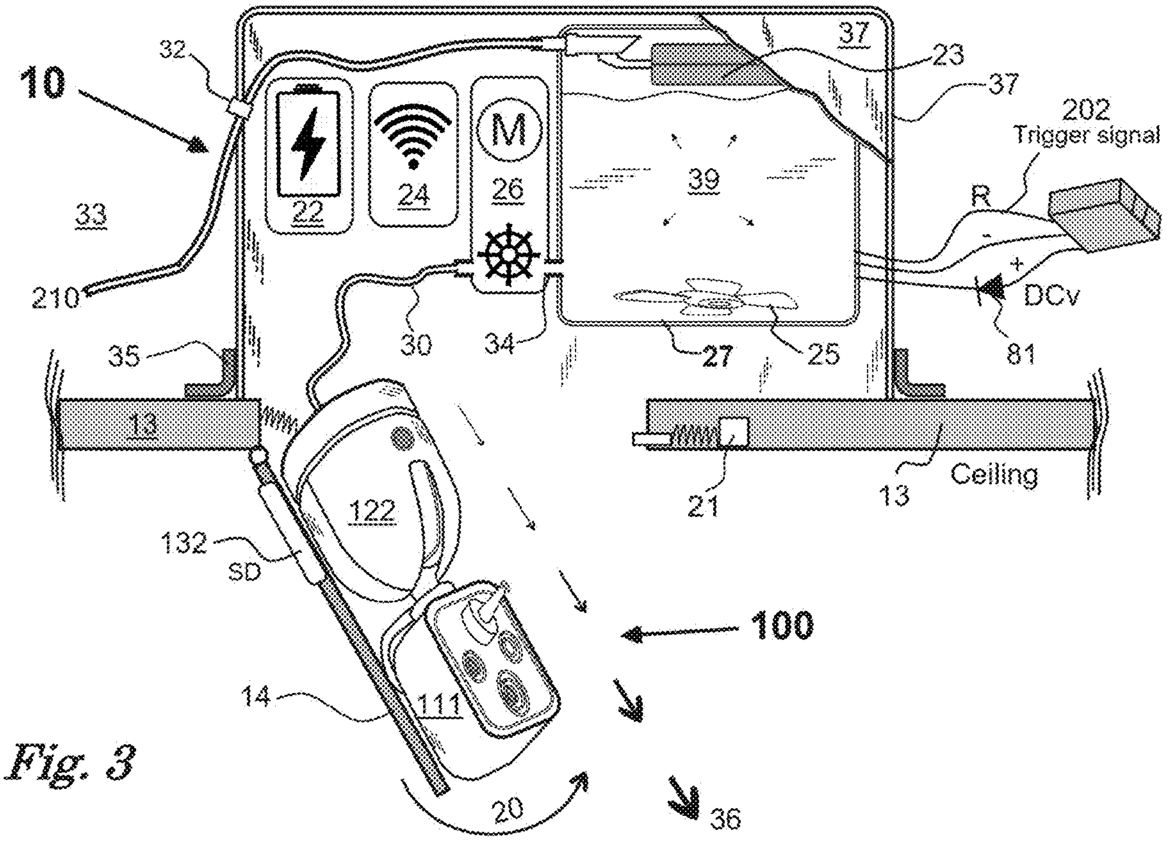
FIG. 3 is a cross sectional view showing a new construction turret fire sprinkler system with its recess metal can installed in the cavity of a ceiling, its panel flipped open letting the turret fire sprinkler module slide down in accordance with an embodiment of the present disclosure.

FIG. 3 is a cross section of system 10 showing a recessed housing 37 installed with a mounting bracket 35 behind the ceiling board 13. The recessed housing 37 contains a rechargeable 12 v 10 amp high capacity battery pack 22 has enough power to maintain the system 10 up to one hour continuous operation. A Wi-Fi 24 connected to the home Wireless router, a ceiling suppressant holding tank 27 holds about one to two gallon (8 liters) of fire suppressant 39 with automatic top-off via a fluid shutoff valve 23. The tank 27 is filled all time by remote fire suppressant supply hose 210 supplies from a remotely located supplemental fire suppressant storage tank 573. A stirring pump 25 is to maintain the suppressant 39 correct mixture consistency and prevent the fire suppressant 39 settled on bottom of ceiling suppressant holding tank 27. A high pressure high flow fire suppressant spray pump 26 pulls suppressant 39 from hose 34 and exits via hose 30 then blasting out aiming at fire 50 via fire suppressant spray nozzle 115.

The AI guidance flame tracking turret fire sprinkler 100 shown is the panel 14 has dropped when the panel electromechanical release latch 21 energized letting the AI guidance flame tracking turret fire sprinkler 100 sliding down as arrow 36 shown when the smoke detector 132 sending a warning signal from itself or sent from another remote smoke detector trigger signal 202 from other rooms. A DCv (direct current volt) diode 81 on the plus "+" line with a negative "−" line to protect the rechargeable battery pack 522. After fire 50 was extinguished and smoke detector 132 was no longer in warning status, the fire suppressant spray pump 26 stopped. Homeowners can manually push the AI guidance flame tracking turret fire sprinkler 100 back into the ceiling cavity 33 and flip up the panel 14 shown in arrow 20 then the panel 14 is flush with ceiling board 13 by the electromechanical release latch 21 again.

Figure 4:
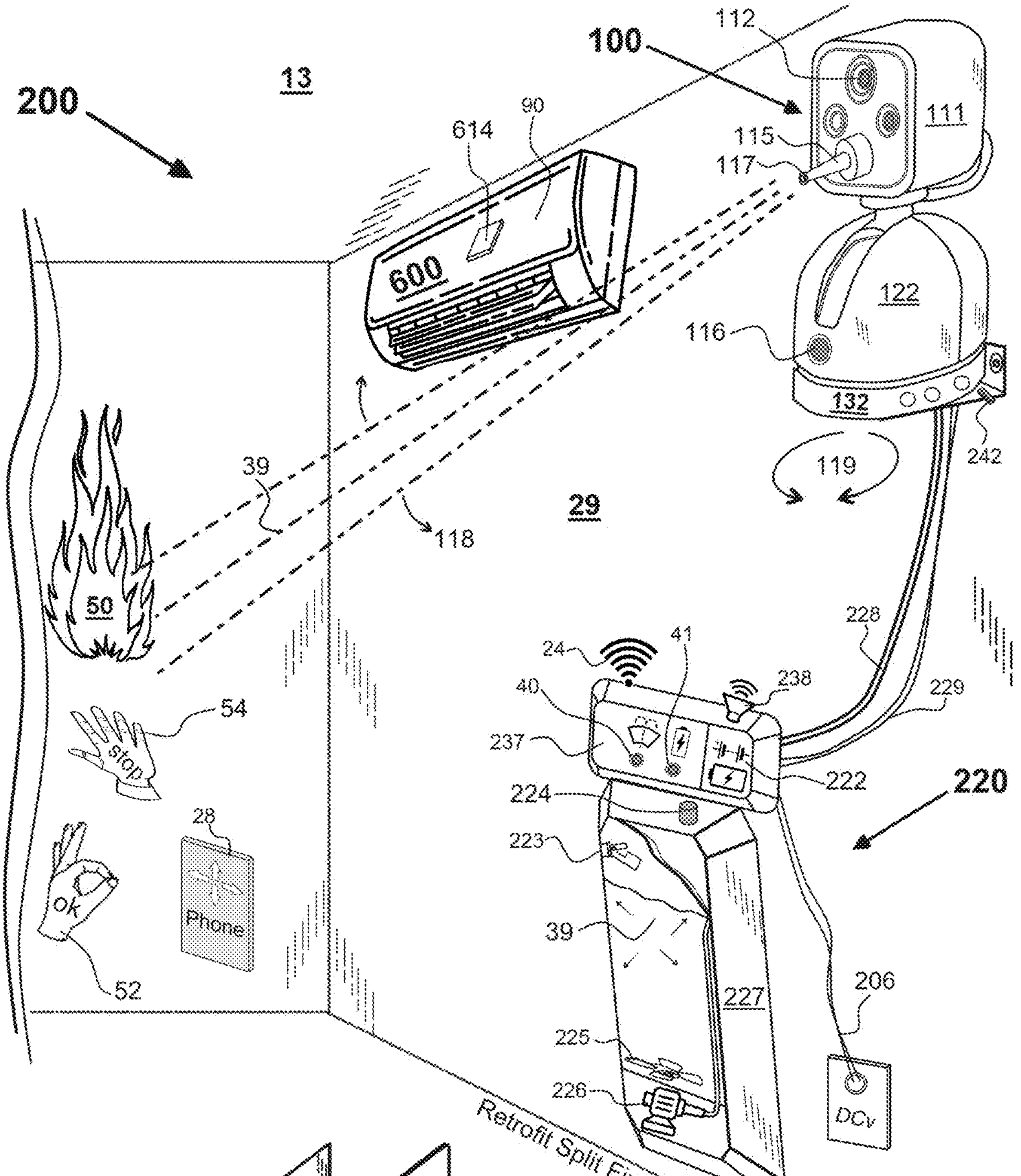
FIG. 4 is the perspective view of a turret configured fire sprinkler for retrofit of existing homes in two split sections including a lower wall section with a fire suppressant tank and power supply, and an upper room section includes an AI guidance flame tracking turret fire sprinkler in accordance with an embodiment of the present disclosure.

FIG. 4 wall mount retrofit split fire sprinkler system 200 for an existing home retrofit to protect a room in the event fire broke out. The system 200 is a two section split configuration that lower wall 29 mounted section 220 includes a fire suppressant tank 227, a charge cable 206 provide electricity to rechargeable battery pack 222, a battery and control panel 237 houses a Wi-Fi 24, a low fire suppressant level warning indicator 40, low battery level warning indicator 41 and an audio sounder 238 alerts the owner pays attention to maintain the system's health condition.

The suppressant tank 227 further includes a top-off fluid shutoff valve 223 to regulate suppressant 39 filling from a mobile fill station 550 through fill inlet 224. A stirring pump 225 prevents suppressant 39 precipitated on the bottom of the tank 227 and causes clogging the high pressure fire suppressant spray pump 226.

Figure 4A:
FIG. 4A is the perspective view of an orifice to be attached on a turret nozzle in accordance with an embodiment of the present disclosure.
Figure 4B:
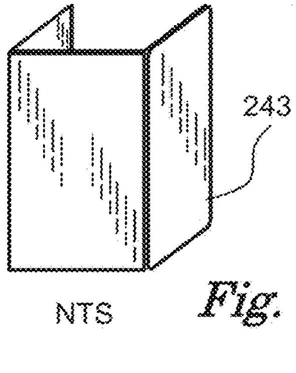
FIG. 4B is the turret cover dropped to ground when the AI guidance flame tracking turret fire sprinkler is deployed in action in accordance with an embodiment of the present disclosure.

The upper room mounted section is the AI guidance flame tracking turret fire sprinkler 100 anchored on a wall 29 with bracket and electromechanical release latch combo 242. A fire 50 triggered the smoke detector 132 and the thermal image tracking camera 112 and the electromechanical release latch 242 result dropping the turret front cover 243 shown on FIG. 4B. The turret head assembly 111 carries the nozzle 115 aiming at the fire 50 blasting with pressurized suppressant 39 delivered from the pump 226 via hose 228. Turret head assembly 111 power is derived from small phone cable 229. Tracking the fire 50 movement is through the pan and tilt MCU 122, shown on FIG. 12 that pan motor rotates 360 degrees shown in direction arrow 119, while tilt motor rotates 180 degrees shown in direction arrow 118. Suppressant 39 spray flow and dispersion pattern is defined by the orifice 117 shown on FIG. 4A. The system 200 is fully automated and self contained and is able to stop spraying a fire 50 when the fire 50 is extinguished. The AI guidance flame tracking turret fire sprinkler 100 also recognizes hand gesture commands through its optical video camera 114 by enhancing with illuminating illuminator 116 and can even be controlled with a Smartphone 28. Under an emergency, showing a five fingers palm gesture 54 toward the optical video camera 114 will stop the fire suppressant spray pump 226 and a zero plus three fingers gesture 52 will resume the fire suppressant spray pump 226 action.

Figure 8:
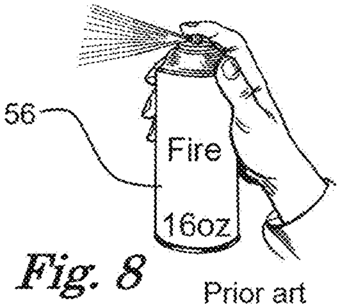
Fig. 8 Prior art
FIG. 8 is the perspective view of a popular aerosol fire extinguisher spray can application in accordance with an embodiment of the present disclosure.
Figure 8A:
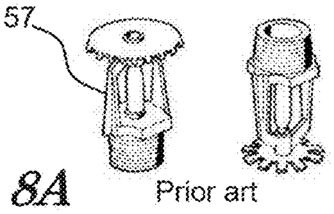
Fig. 8A Prior art
FIG. 8A is the perspective view of a traditional water based fire sprinkler head application in accordance with an embodiment of the present disclosure.
Figure 15:
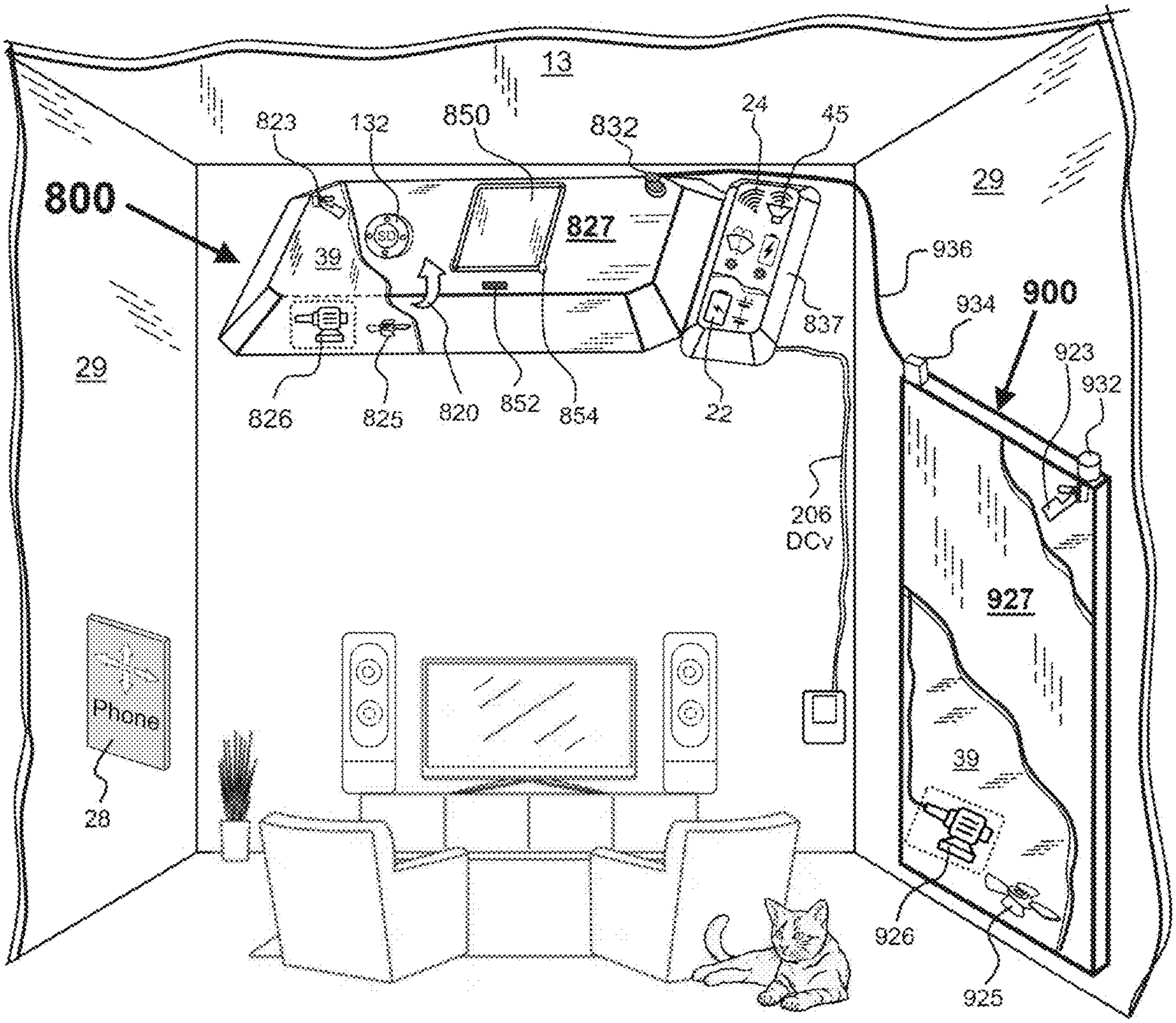
FIG. 15 illustrates the AI guided fire sprinkler system installed in a living room is not in deployed position in accordance with an embodiment of the present disclosure.

Based on a volume conversion and calculation: a size of 14 inch×50 inch×6 inch (36 cm×127 cm×15 cm) wall mount internal fire suppressant tank 827 shown in FIG. 15 or a tank 227 shows on FIG. 4 holds 18 gallon or (70 liter) of fire suppressant 39. At a popular 16 ounce fire suppressant aerosol spray 56 depicted on FIG. 8 yields 0.125 gallon, which means a gallon equals 8 cans of aerosol spray 56. The tank 827 effectively holds an equivalent to 8×18=144 cans of aerosol fire suppressant spray 56. Manufacture data shows a 16 ounce spray can 56 lasts 30 seconds to empty. Given the flow rate at 2 gallon per minute and adapts a variable spray table depicts in FIG. 5 and FIG. 5A using a method "Pulse-Period Modulation" can keep spraying over 10 minutes as required by fire code. The fire suppressant spray pump 826 effectively spraying 16 equivalent cans of fire suppressant 56 simultaneously on the flame 50. Thus the tank 827 will not be emptied in about 10 minutes. In real life situations, a fire 50 will be under control in a few minutes.

More details on FIG. 5 is to deal with limited room space to install a very large size internal fire suppressant tank 827 to comply safety code required by fire dept. The invention utilizes an intermittent power on-off technique to maintain a fire suppressant 39 pressures high enough to reach its destination while minimize waste of fire suppressant 39 but still provides adequate time for occupant to escape from the fire scene. The table on FIG. 5 is Pulse-Period Modulation to conserve fire suppressant 39 illustrates with the help from the optical video camera 114, the fire suppressant spray pump 826 is on full power at normal operating voltage of 12 volt splashing 2 gallon per minute, the spray pump 826 then reduces to 0.5 gallon per minute when the optical video camera 114 confirmed no occupant presence in the fire scene. A graphic illustration on FIG. 5A indicates suppressant 39 pressure must be higher than 30 psi to crack open the check valve 831 for delivery suppressant 39 to spray nozzle 115. Suppressant 39 pressure at 15 psi will not pass through the check valve 831 but returning to the suppressant tank 827 with the normally close valve 833 open in self test mode.

Figure 6:
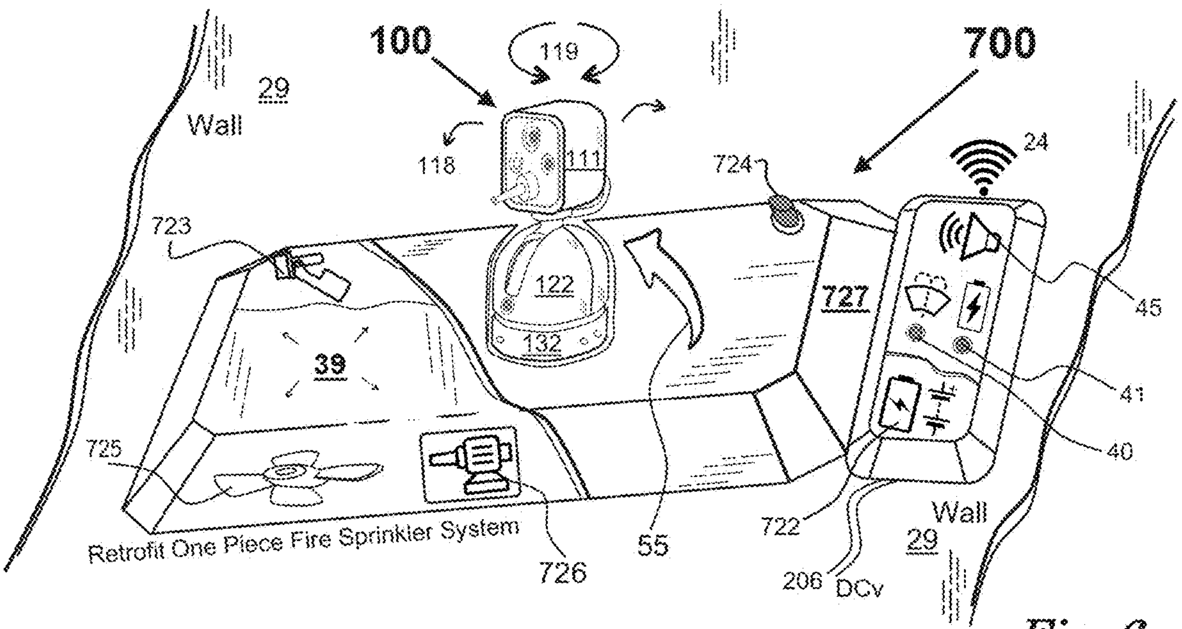
FIG. 6 is the perspective view of a semi-recessed single piece all-in-one including suppressant tank, battery power and AI guidance flame tracking turret fire sprinkler installed on upper room or over a door wall position in a retrofit application in accordance with an embodiment of the present disclosure.

FIG. 6 is an integrated, retrofit one piece sprinkler system 700, which is a variant of FIG. 4. The system 700 resembles the system 200 includes control panel and battery 722, a fire suppressant tank 727, a suppressant pump 726, a stirring pump 725, a top-off fluid shutoff valve 723 and fill inlet 724. The AI guidance flame tracking turret fire sprinkler 100 normally rests on a recessed niche flush with the front surface of the tank 727. When a fire 50 is detected, the AI guidance flame tracking turret fire sprinkler 100 popped up from its recessed niche shown on arrow 55 begins to fight the erupted fire 50. The single piece system 700 similar to system 600 is to be installed above a window, installed on the upper room of a wall 29 and on top of a door header. Power is supplied via a very small electric current phone line 206.

Figure 7:
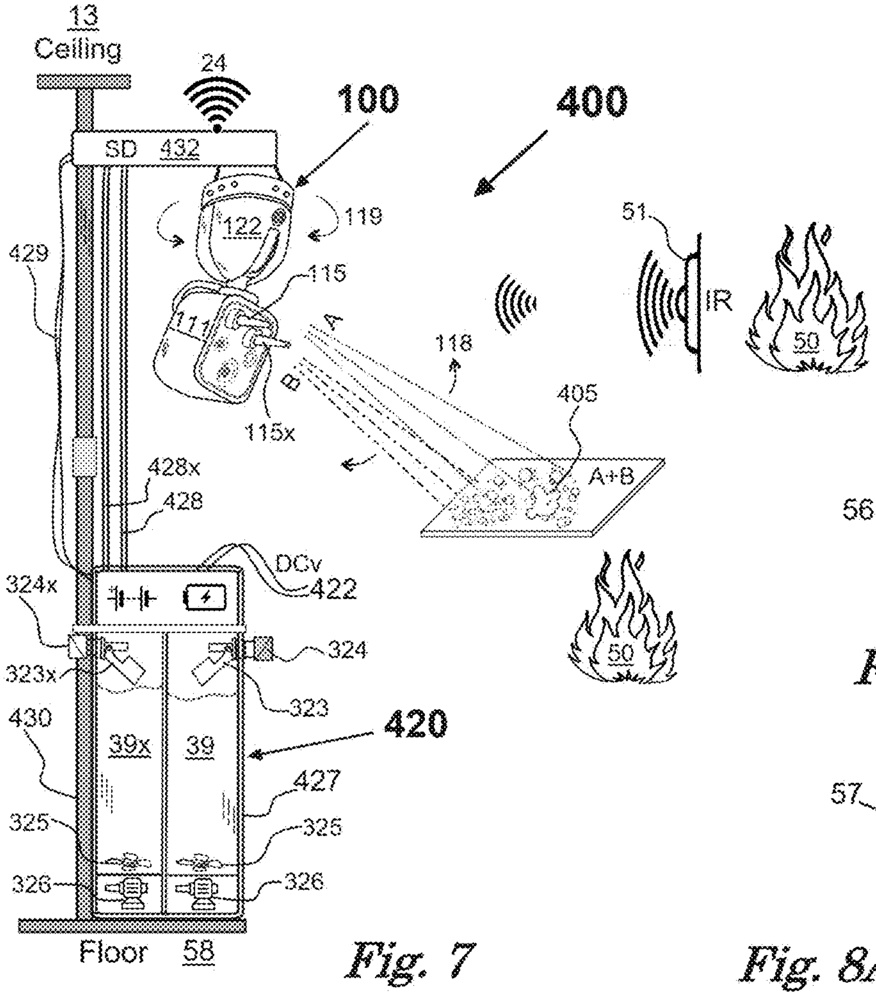
FIG. 7 is the perspective view of a turret configured fire sprinkler mounted on a floor post for retrofit existing homes in two split two sections including a floor section with dual fire suppressant tanks and power supply, and an upper room section AI guidance flame tracking turret fire sprinkler with two nozzles to generate spray dissimilar foams in accordance with an embodiment of the present disclosure.

Turning to FIG. 7 is Mobile Dual Nozzle fire sprinkler system 400. The system 400 can be mobile which is to be temporarily fixed on floor 58 and ceiling 13 via a tension post 430 holding the floor section 420 in place. The section 420 includes control panel and battery 422 send power to the AI guidance flame tracking turret fire sprinkler 100 via cable 429, a dual fire suppressant tank 427, two suppressant pump 326, two stirring pump 325, two top-off fluid shutoff valve 323, 323*x*, two fill inlet 324, 324*x* and smoke and heat detection sensors 432. The AI guidance flame tracking turret fire sprinkler 100 draws two dissimilar suppressants 39, 39*x* through hose 428 and 428*x* blasting out via nozzle 115 and 115*x* landed on target 405 then the two dissimilar fire suppressant 39 and 39*x* self mixed on the target 405 quickly reacting chemically similar to an intumescent reaction preventing combustible gas such oxygen entering the target 405 effectively extinguishing a fire 50. FIG. 7 showing a fire 50 erupted, first it triggers the smoke detector 432 then the thermal image tracking camera 112 picks up passive infrared electromagnetic waves 51 interprets as a real fire 50.

Figure 9A:
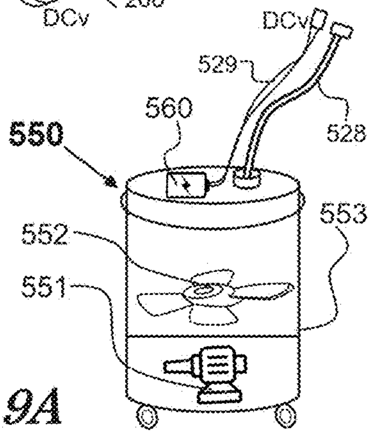
FIG. 9A is a depiction showing a mobile charge station capable of supplying top-off fire suppressant and electrical power to the interior of a house which is equipped with a turret sprinkler system in accordance with an embodiment of the present disclosure.
Figure 9:
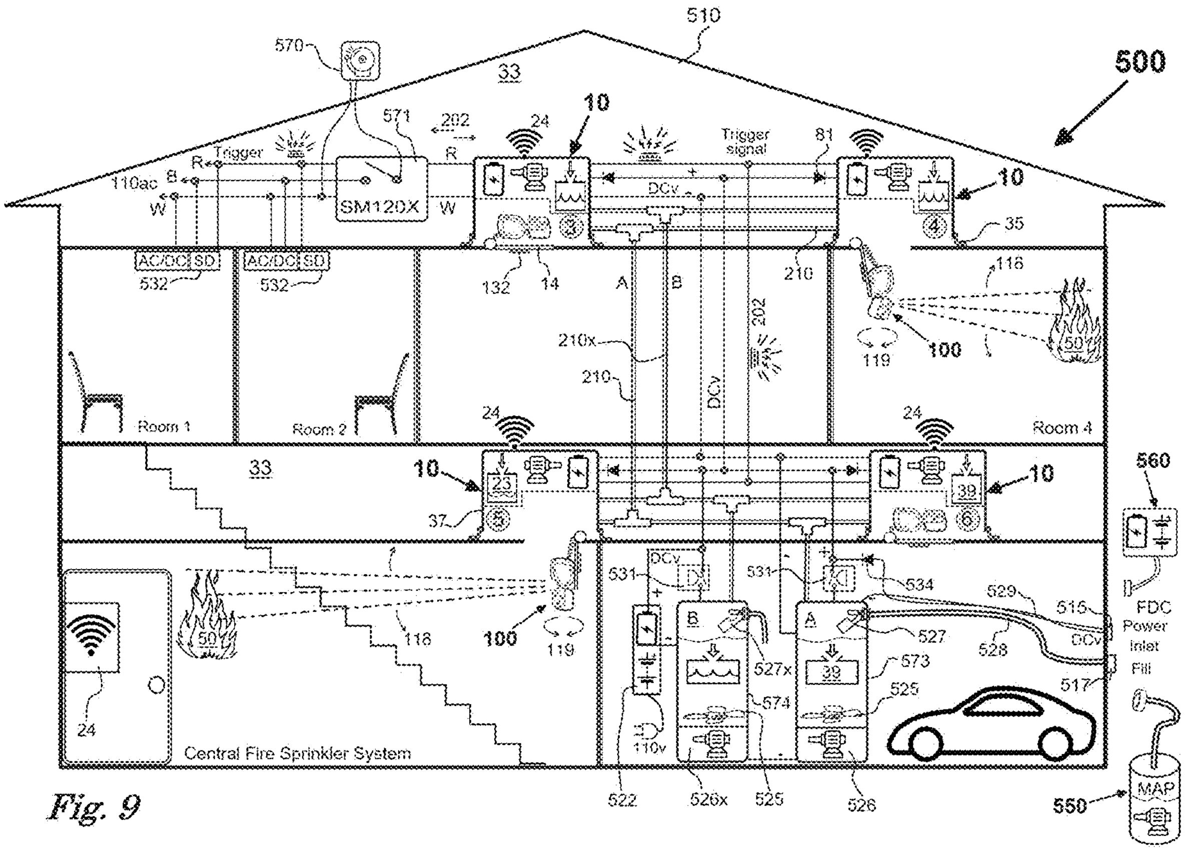
FIG. 9 is a schematic view illustrating the turret based fire suppression system installed on a new construction structure showing electrical wiring, plumbing layout and features accepting exterior suppressant top-off and exterior power booster components to extend operation duration in accordance with an embodiment of the present disclosure.

FIG. 9 is a concealed in ceiling 33 central fire sprinkler system 500 to be installed on a new home 510 with schematic drawings illustrating electrical wiring and plumbing connection. When a fire 50 is erupted, anyone of the smoke detector 132 will alert all ceiling turret sprinkler 10 via hardwired or a residential or commercial wireless communications device including a conventional Wi-Fi 24 connection. Each ceiling turret sprinkler 10 checks if the alert is generated from its own smoke detector 132. If the alert is confirmed to be generated from its own detector 132, the affected ceiling turret sprinkler 10 releases its electromechanical release latch 21 dropping down its AI guidance flame tracking turret fire sprinkler 100. The AI guidance flame tracking turret fire sprinkler 100 sliding down until its Turret head assembly 111 cleared from the panel 14 starts searching for fire 50 with pan 119 and tilt 118 direction motion then blasting the fire 50 with its fire suppressant 39 from its tank 27. Since its ceiling tank 27 has limited capacity, as soon as the fire suppressant spray pump 26 starts drawing suppressant 39, its top-off fluid shutoff valve 23 open allows the remotely located supplemental fire suppressant storage tank 573 replenish the ceiling tank 27 automatically via the pressure sensitive regulated switch 531, with the built-in fire suppressant top off pump 526, stirring pump 525 and remote fire suppressant supply hose 210. The auto replenishes action assures the ceiling tank 27 is always filled with fire suppressant 39.

The system 500 has an optional large capacity remotely located supplemental fire suppressant storage tank 574 includes built-in fire suppressant top off pump 526*x*, stirring pump 525, top-off fluid shutoff valve 527*x*, pressure sensitive regulator switch 531 and remote fire suppressant supply hose x for storing dissimilar fire suppressant 39 for a purpose of dual suppressant dual nozzle turret sprinkler system 400 depicted in FIG. 7 for reference.

The remotely located rechargeable battery power for the system 500 is provided by a 12 v, 35 amp rechargeable battery pack 522 which has enough energy to power the four sprinkler systems 10 simultaneously for an hour.

The integrated smoke detector 132 of system 10 is compatible with traditional smoke detector 532 via a common trigger signal line 202 and through a relay switch 571 able to activate an exterior installed siren 570 or send notification to fire dept. or via Wi-Fi 24.

The system 500 shows four rooms equipped with flip down concealed ceiling turret fire sprinkler 10. Room 3 and room 6 are not affected with fire 50 and their AI guidance flame tracking turret fire sprinkler 100 are remain stowed in the ceiling cavity 33 while room 4 and room 5 are showing the sprinkler system 10 are in deployed position with their s AI guidance flame tracking turret fire sprinkler 100 are dropped and spraying suppressant 39 at the fire 50.

The system 500 further accepts the exterior suppressant 39 replenishment via top-off fluid shutoff valve 527 and exterior fill hose 528 at port 517 and battery charge via cable 529 with protection diode 534 at port 515.

A mobile exterior fill station 550 and mobile exterior power battery charger 560 shown on FIG. 9A contains a fire suppressant tank 553 complete with an exterior built-in fire suppressant top off pump 551 and a stirring pump 552 and battery charger 560. The mobile station 550 is to be rolled to the exterior wall of a home connecting to (FDC) Fire Dept. Connection port extended the fire fighting duration due to a severe fire situation.

Figures 10, 11:
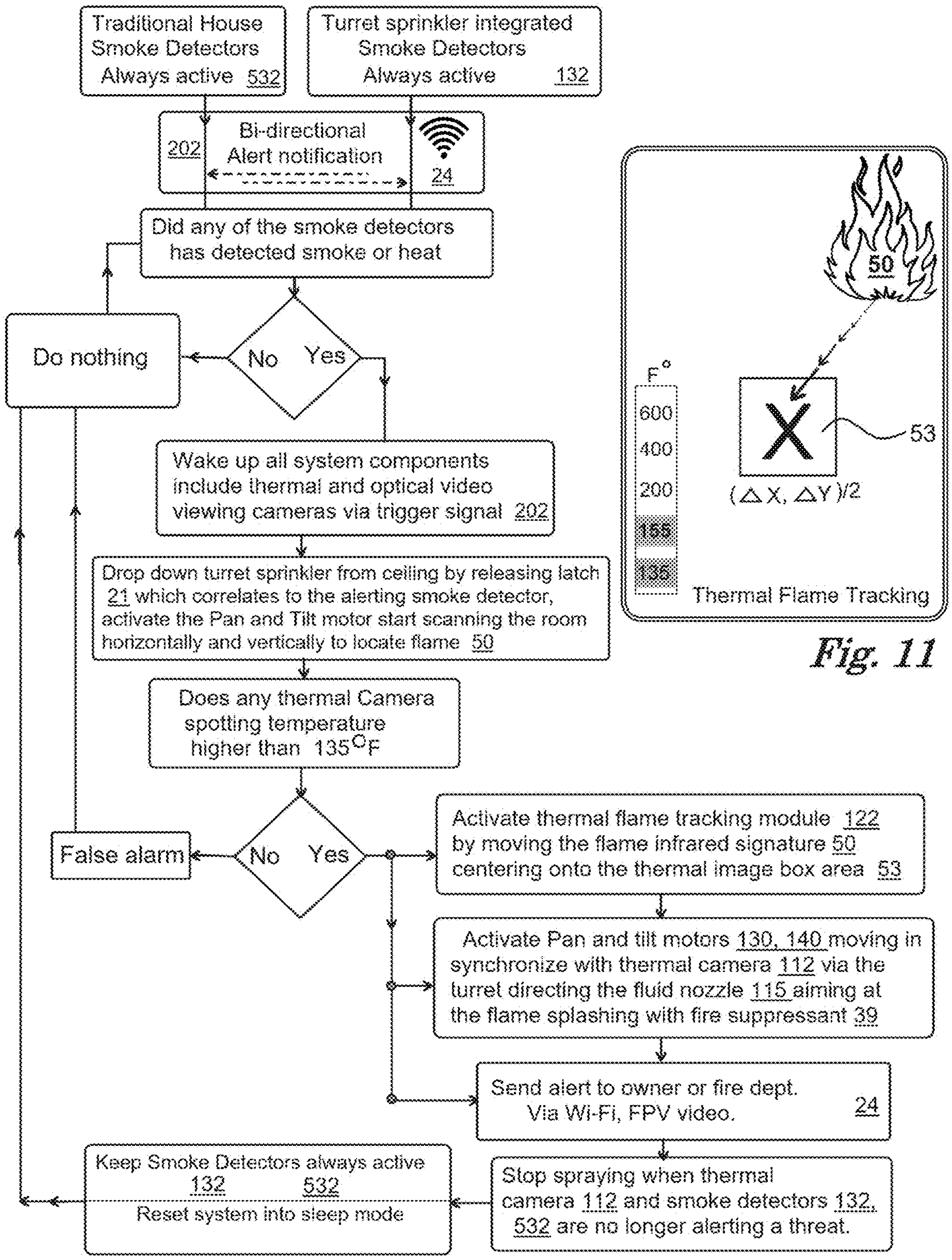
FIG. 10 is a system operation illustration of the turret sprinkler from start to stop in accordance with an embodiment of the present disclosure.
FIG. 11 is an exemplary projected image illustrating how the pan and tilt base carries the nozzle to track the flame by moving the thermal image on fire into the center of the box location to put out a fire in accordance with an embodiment of the present disclosure.

Turning to FIG. 10 is flow chart illustrating the process of system 500 putting out a fire 50 from detection to extinguish a fire 50 through the use of optical video camera 114 with face-object movement tracking, and a thermal image tracking camera 112 on Open MV Pure Thermal board, using a Raspberry Pi Computer board and OpenCV and Pan-Tilt HAT. FIG. 11 illustrates the fire 50 displays on the image frame being pulled into the center on frame 53 positions which is the fire suppressant spray nozzle 115 target areas to land the fire suppressant 39.

Figure 13D:
FIG. 13D is the perspective view of a piece of dried fire suppressant coating left on the surface after the bubble popped in accordance with an embodiment of the present disclosure.
Figure 13:
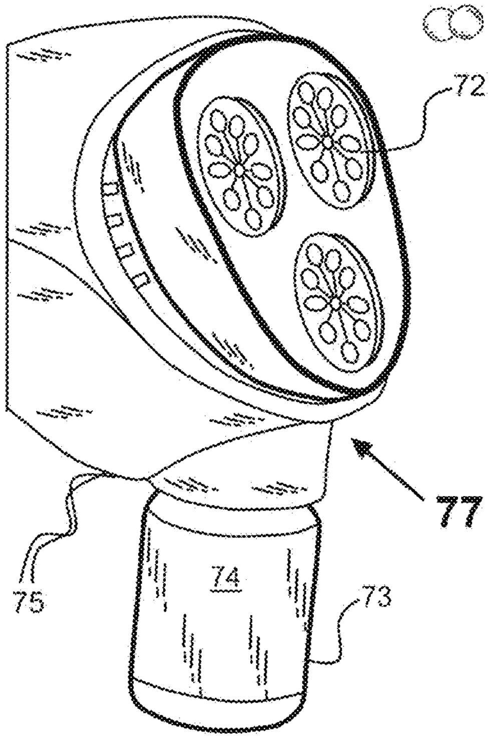
FIG. 13 is the perspective view of a bubble generator module in accordance with an embodiment of the present disclosure.
Figure 13E:
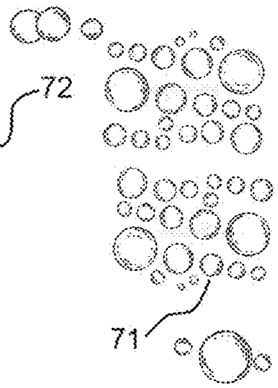
FIG. 13E is the perspective view of bubbles drifting in a room in accordance with an embodiment of the present disclosure.
Figure 13C:
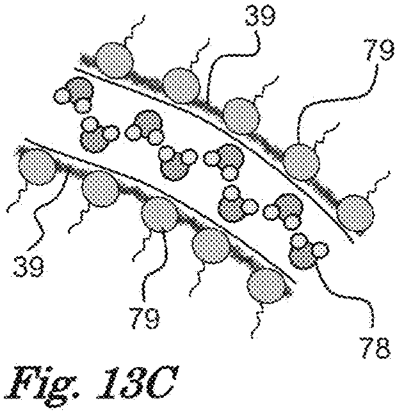
FIG. 13C is the view of a highly magnified soap bubble with added fire suppressant in accordance with an embodiment of the present disclosure.
Figure 13B:
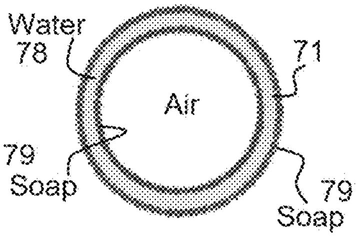
FIG. 13B is the view of a highly magnified bubble in accordance with an embodiment of the present disclosure.
Figure 12:
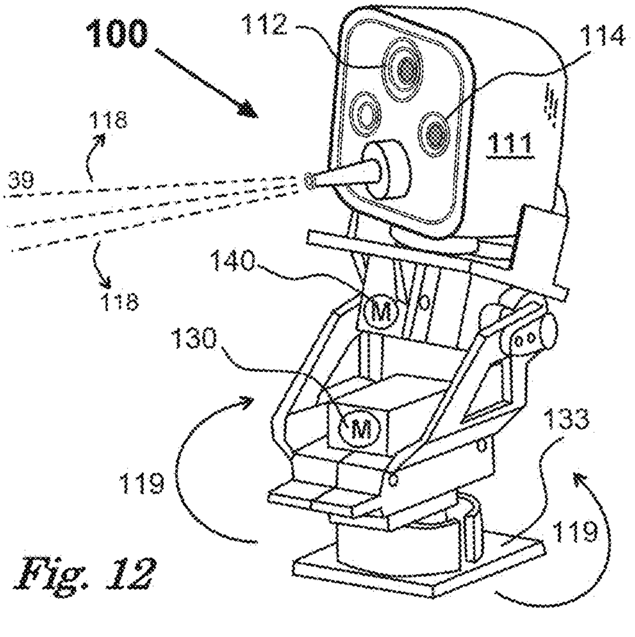
FIG. 12 is the perspective view of a pan and a tilt base with its outer decorative shell removed to show the interior details in accordance with an embodiment of the present disclosure.

FIG. 12 is an AI guidance flame tracking turret fire sprinkler 100 showing its interior view with its housing removed showing the pan and tilt mechanical system carrying the turret head assembly 111. The turret pan servo motor 130 is mounted on the servo motor base mount 133 and is able to rotate 360 degrees shown in arrow 119 and turret tilt servo motor 140 is able to rotate 180 degrees as shown in arrow 118. FIG. 13 is a bubble generator module 77 includes a soap bottle 73, soap bubble solution 74 is added with fire suppressant or retardant 39 such as Polyphosphate, Ammonium Polyphosphates, Mono ammonium Polyphosphates, Sodium Polyphosphate and the like. A power cable 75 supplies power to run a group of peristaltic pumps 61 and blower fans 63. Soap solution 74 is being sucked into the pump 61 forced out through the tube 62 discharging on the bubble spinning wheels 72 then blowing out to a room shown on FIG. 13F. Bubble 71 once left bubble machine 77 floating on air and drifting in the room shown on FIG. 2. After the bubble popped left a coating of fire retardant 39 shown on FIG. 13D. The fire suppressant or retardant 39 Ammonium polyphosphates swelling up when heated thus protecting material underneath in event of a fire.

Figure 13A:
FIG. 13A is another perspective view of a bubble in accordance with an embodiment of the present disclosure.
Figure 13F:
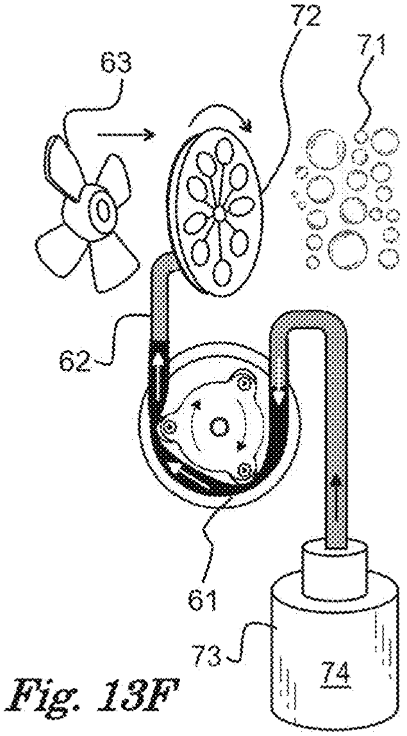
FIG. 13F is the perspective view showing how bubbles are made in accordance with an embodiment of the present disclosure.

FIG. 13A is a soap bubble 71. An enlarged view of a soap bubble 71 shown on FIG. 13B. A molecular structure of a bubble 71 showing on FIG. 13C includes water 78, soap molecule 79 and fire retardant molecule 39 embedded on the soap solution 74.

A large quantity of bubbles 71 displacing the combustible gas in a room, thus speeding up extinguishing a fire 50 with the combined effort using AI guidance flame tracking turret fire sprinkler 100 and bubble generator module 77.

Figure 14:
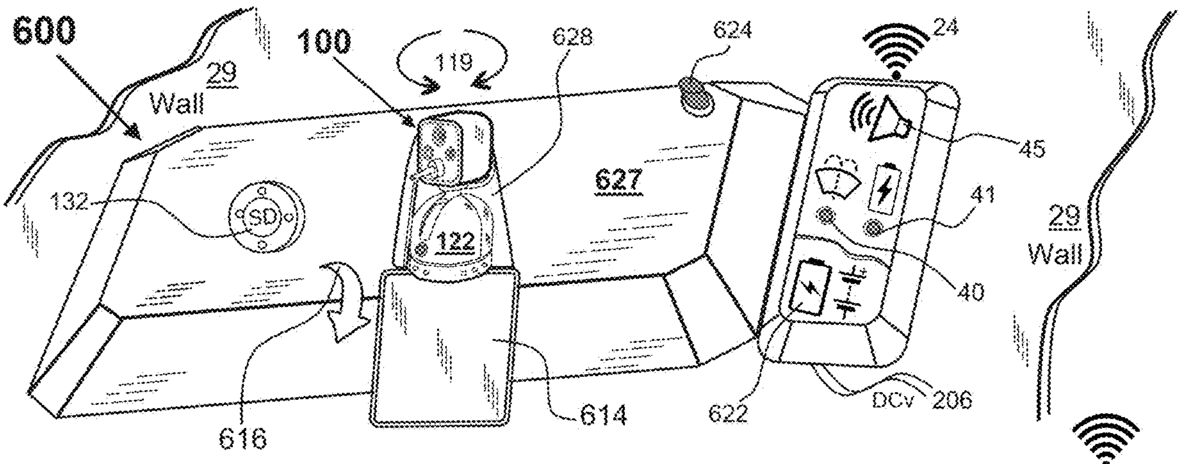
FIG. 14 is the perspective view of an all-in-one single piece fire suppression sprinkler system including suppressant tank and uninterrupted battery power with concealed AI guidance flame tracking turret fire sprinkler installed on an upper room wall or over a door header position in accordance with an embodiment of the present disclosure.

Turning to FIG. 14 is an integrated, ideal for retrofit application single piece all-in-one retrofit one piece AI guided fire sprinkler system 600, which is a variant of FIG. 6. The system 600 resembles the system 700 includes control panel 637 and battery 622, a large capacity fire suppressant tank 627, a suppressant pump 626, a stirring pump 625, a top-off fluid shutoff valve 623 and fill inlet 624. The AI guidance flame tracking turret fire sprinkler 100 normally recesses on a turret recessed niche 628 which connects to hose 228 and power cable 229.

Figure 14A:
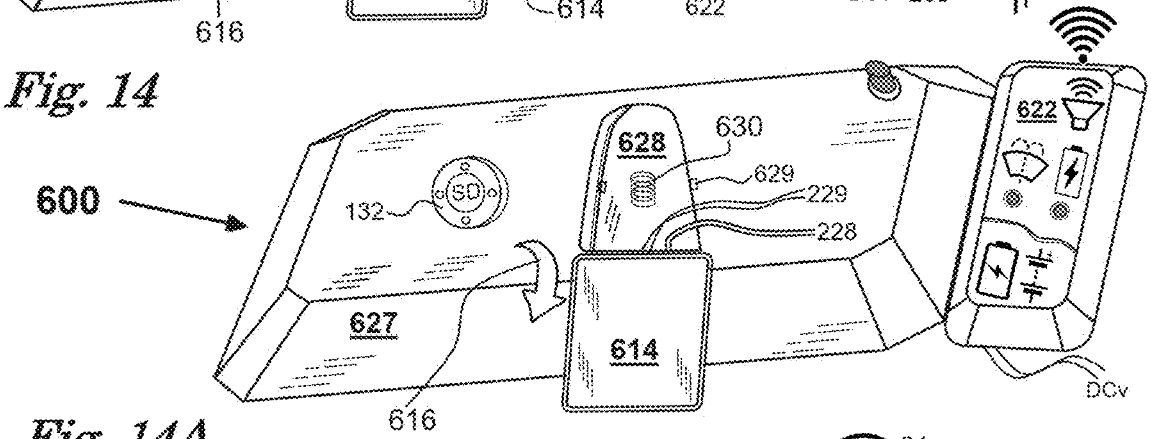
FIG. 14A is the perspective view of an all-in-one single piece fire suppression sprinkler system showing AI guidance flame tracking turret fire sprinkler removed to reveal the recessed niche and a spring and its cover plate in flipped down position in accordance with an embodiment of the present disclosure.

When a fire 50 is detected, the AI guidance flame tracking turret fire sprinkler 100 sends a signal to release the turret cover plate electromechanical release latch 629 shown on FIG. 14A causes the AI guidance flame tracking turret fire sprinkler 100 which is under the spring 630 tension pushes out the AI guidance flame tracking turret fire sprinkler 100 along with cover plate 614 being flipped down as shown in arrow 616. Once the AI guidance flame tracking turret fire sprinkler 100 cleared from its recessed niche 628, the AI guidance flame tracking turret fire sprinkler 100 began to fight the erupted fire 50. For illustration purpose, the AI guidance flame tracking turret fire sprinkler 100 is removed to reveal the recessed niche 628. The single piece system 600 is ideally to be installed above a window, installed on the upper room position of a wall 29 and on top of a door header. In reference to FIG. 4 installation, the installed AI guided fire sprinkler system 600 mimics the look of a wall mounted split air handler 90 from an air conditioner.

Figure 14B:
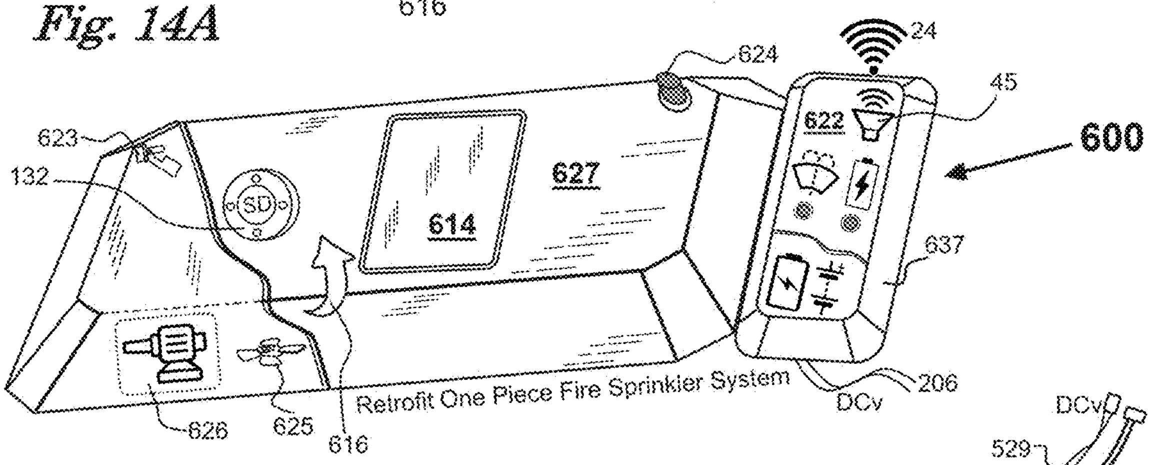
FIG. 14B is the perspective view of an all-in-one single piece upper room mounted fire suppression sprinkler system with its flip open turret cover plate in closed non deployed position in accordance with an embodiment of the present disclosure.
Figure 3A:
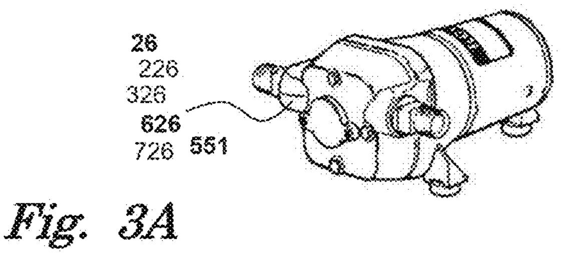
FIG. 3A is a perspective view showing a popular application of a high pressure, high flow rate fluid spray pump in recreation vehicles in accordance with an embodiment of the present disclosure.

FIG. 14B shows the AI guided fire sprinkler system 600 is in its normal appearance when the turret cover plate 614 is manually closed in non deployed position in accordance with an embodiment of the present disclosure.

Turning to FIG. 15 is the Artificial Intelligence Guided Fire Sprinkler system 800 installed in a living room wall 29 with an optional Remotely Located External supplemental fire suppressant storage tank 900 which can be installed in a garage or in other room in a building. Its controller 837 and the internal fire suppressant tank 827 is a variant of the system 600 shown in FIGS. 14, 14A and 14B. The AI guided fire sprinkler system 800 resembles the system 600 includes control panel 837 and battery 22, a 18 gallon capacity with dimension of 14 inch×50 inch×6 inches Internal fire suppressant tank 827, a fire suppressant spray pump 826, a stirring pump 825, a top-off fluid shutoff valve 823 and fill inlet 832. The AI guidance flame tracking turret fire sprinkler 100 which connects to fire suppressant hose 873 and power cable 206. Since there is no fire 50 is being detected, the AI guided fire sprinkler system 800 is in its normal appearance when the AI guidance flame tracking turret fire sprinkler 100 is concealed by its metal hinged flip door panel 850 which is manually closed indicated with arrow 820 in non deployed position.

A low profile Remotely Located External supplemental fire Suppressant storage tank 900 is optional which can provides extended spray time in a large space such as a warehouse. The External fire suppressant tank 900 includes stirring pump 925, a built-in fire suppressant top off pump 926, a fill inlet 932, a top-off fluid shutoff valve 923, a custom fit for the Internal fire suppressant tank 827 top off outlet adapter 934 and a top off hose 936. While the fluid capacity of the Internal fire suppressant tank 827 has already complies with the local fire requirement, with an additional slim rectangular shaped shell 927 which measures 36 inch×48 inch×2 inches holds 15 gallons of extra fire suppressant 39 which is well exceeds the fire dept. required spray duration also offering the occupants peace of mind.

Figure 16:
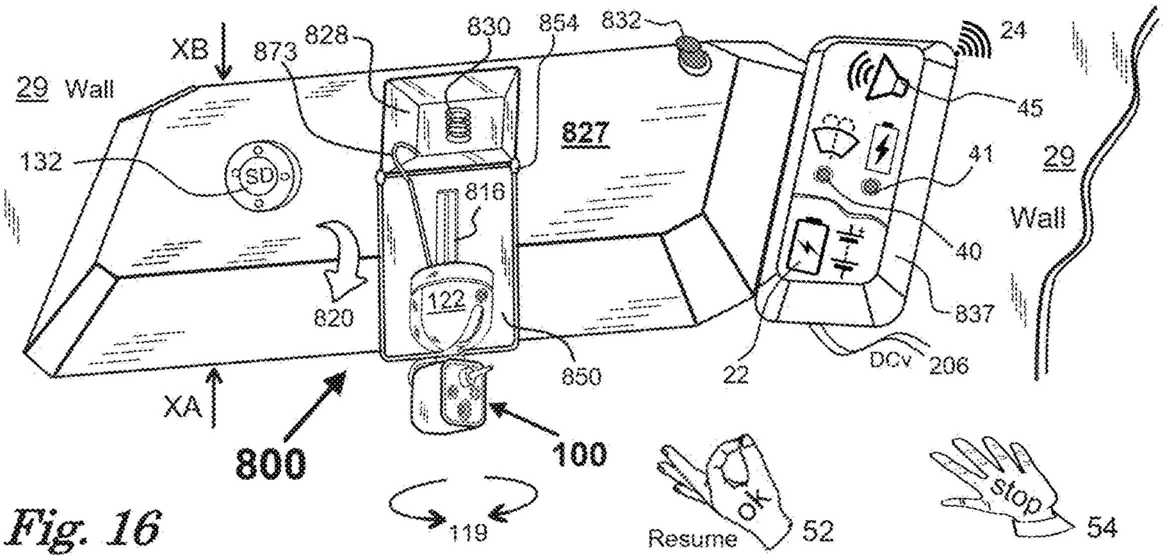
FIG. 16 is the perspective view of the AI guided fire sprinkler system is in deployed position ready to extinguish a fire in accordance with an embodiment of the present disclosure.

Illustrates on FIG. 16 is a wall 29 mounted AI guided fire sprinkler system 800 in deployed position, its hinged flip door panel 850 flipped open allowing the AI guidance flame tracking turret fire sprinkler 100 emerged from its turret recessed niche 828. Upon the turret head assemble 111 cleared the hinged flip door panel 850, it scans the premises in 360 degrees wide range indicates with arrow 119 to lock in the flame 50 movement using its thermal image tracking camera 112. In an event that the fire 50 was determined a mistake, the occupant uses hand gesture facing to the optical video camera 114 showing a five fingers palm stop hand gesture 54 to stop the AI guided fire sprinkler system 800 from spraying suppressant 39 which is programmed by temporary halting power to the fire suppressant spray pump 826 in a panic situation, and showing a zero plus three finger palm “OK” hand gesture 52 signals to resume spraying of suppressant 39 if the fire 50 is indeed real.

Turning to FIG. 17 is a table showing by combining a 30 psi built-in crack pressure check valve 831, an electric normally close valve 833 and a Tec pipe diverter fitting 834 to perform unattended fully Automated Fire Sprinkler Self Test System 810.

The table indicates fire suppressant spray pump 826 requires reducing to a low 3 volt from its normal operating voltage 12 volt to produce 15 psi for self testing the AI guided fire sprinkler system 800.

Turning to FIG. 18 is cross section view of the AI guided fire sprinkler system 800 is not in deployed position with its hinged flip door panel 850 secured with a flip door panel hinge 854 and the hinged flip door panel 850 is pushed in closed position indicated by arrow 820. The AI guided fire sprinkler system 800 may have been sitting idle for months waiting to do its duty when it is needed. The fire suppressant 39 may have settled on bottom of the internal fire suppressant tank 827 and the fire suppressant spray pump 826 may have collected sediment buildup that dried out from fire suppressant 39 may cause the AI guided fire sprinkler system 800 inoperable when there is a fire 50 erupted. To solve the problem, the invention further includes an Automated Fire Sprinkler Self Test System 810 indicated from table on FIG. 17 can performs periodically exercise the fire suppressant spray pump 826 by lowering the voltage to the fire suppressant spray pump 826 to 3 v. This 3 v generates only 15 psi is not high enough to crack open the 30 psi one way seal inside the check valve 831, result no fire suppressant 39 delivers to the fire suppressant spray nozzle 115.

At the same time the electric normally close valve 833 is energized, open a path for the stagnant fire suppressant 39 from fire suppressant spray pump 826 inlet 860 then through the outlet hose 861 then got diverted through the Tee pipe diverter fitting 834 via normally close valve inlet hose 862 then pass through the fully open electric normally close valve 833 routed by the normally close valve outlet hose 863 and returning to the internal fire suppressant tank 827 indicated by arrow 864 to dissolve and flush out any crystalline deposit in the AI guided fire sprinkler system 800 without wetting the premises. The self test actions also load test the battery 22, checking fire suppressant 39 levels, and briefly power up and exercise the servo motors 130 and 140.

And briefly send a short stream of fire suppressant 39 to the suppressant spray nozzle 115 by sending a few PPM technique pulses to the fire suppressant spray pump 826. This minimal volume of fire suppressant 39 splashed out from suppressant spray nozzle 115 for the testing action is collected inside the drip catcher tray 835 until it naturally dried out without any occupant attention. The inlet of the electric normally closed valve 833 is connected to the outlet of the tee pipe diverter fitting 834 via the inlet hose 862. The inlet hose 862 serves as a distinct element to transfer fire suppressant. During self-testing operations, the fire suppressant passes through the electric normally closed valve 833 and discharges back into the internal fire suppressant tank 827. The electric normally closed valve 833 is energized in open position during self-test.

Any deficiencies such as low fire suppressant 39 levels will display on LED indicator 40 and low battery 22 will display on LED 41 and sound an alert via audio sounder alarm 45 and send alert via Wi-Fi 24 to occupant assures the health and readiness of the AI guided fire sprinkler system 800.

Figure 19:
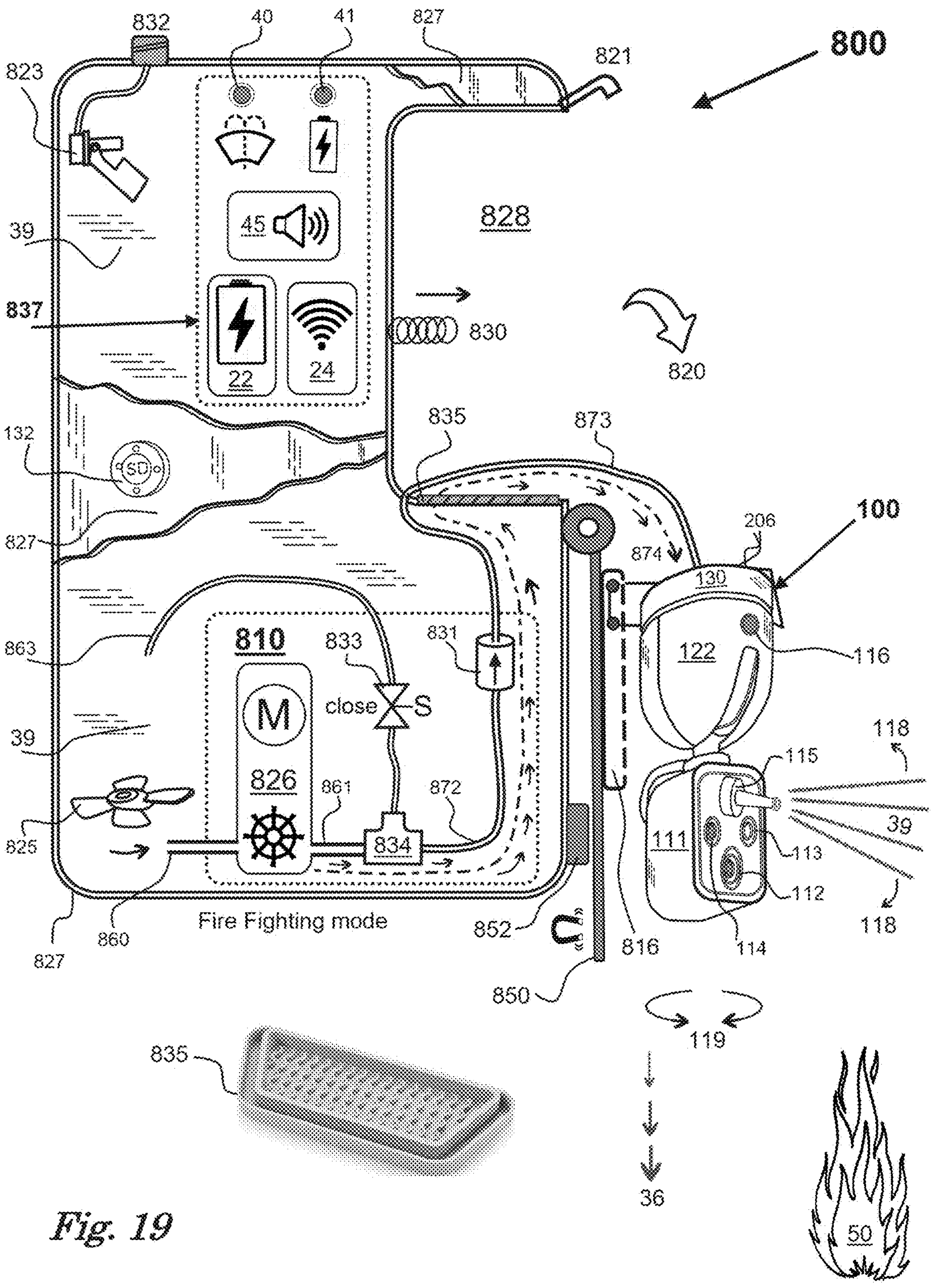
FIG. 19 is a cross sectional view of AI guided fire sprinkler system its hinged flip door panel flipped down is in deployed position showing a cut open fire suppressant tank to reveal the components inside its tank in accordance with an embodiment of the present disclosure.

Turning to FIG. 19 is cross section view of the AI guided fire sprinkler system 800 is in deployed position with its electromechanical release latch 821 lifted causing the hinged flip door panel 850 is pushed outward by a spring 830 indicated by arrow 820. The hinged flip door panel 850 flipped caught and secured by a vibration damping magnet 852. The AI guidance flame tracking turret fire sprinkler 100 slide downward indicated by arrow 36 guided by a set of slide rails 816 until the Turret head assemble 111 clear the hinged flip door panel 850. The Automated Fire Sprinkler Self Test System 810 partially shares the same components as in the normal fire fighting. Fire suppressant 39 to spray pump inlet 860 got pressurized by suppressant spray pump 826 to 65 psi at outlet 861 pass through a Tee pipe diverter fitting 834 to check valve 831 via hose 872. Check valve 831 open at 30 psi sending fire suppressant 39 to hose 873 indicated by arrow 874. The fire suppressant spray nozzle 115 tracks the flame 50 in vertical direction 118 and horizontal direction 119. The same fire suppressant spray pump 826 used for the internal fire suppressant tank 827 is responsible for both pushing suppressant to the fire suppressant spray nozzle 115 and returning it back to the internal fire suppressant tank 827 during self-testing operations. The fire suppressant spray pump 826 shares the duty for the fire fighting mode and doubles as the self-testing function.

Figure 20:
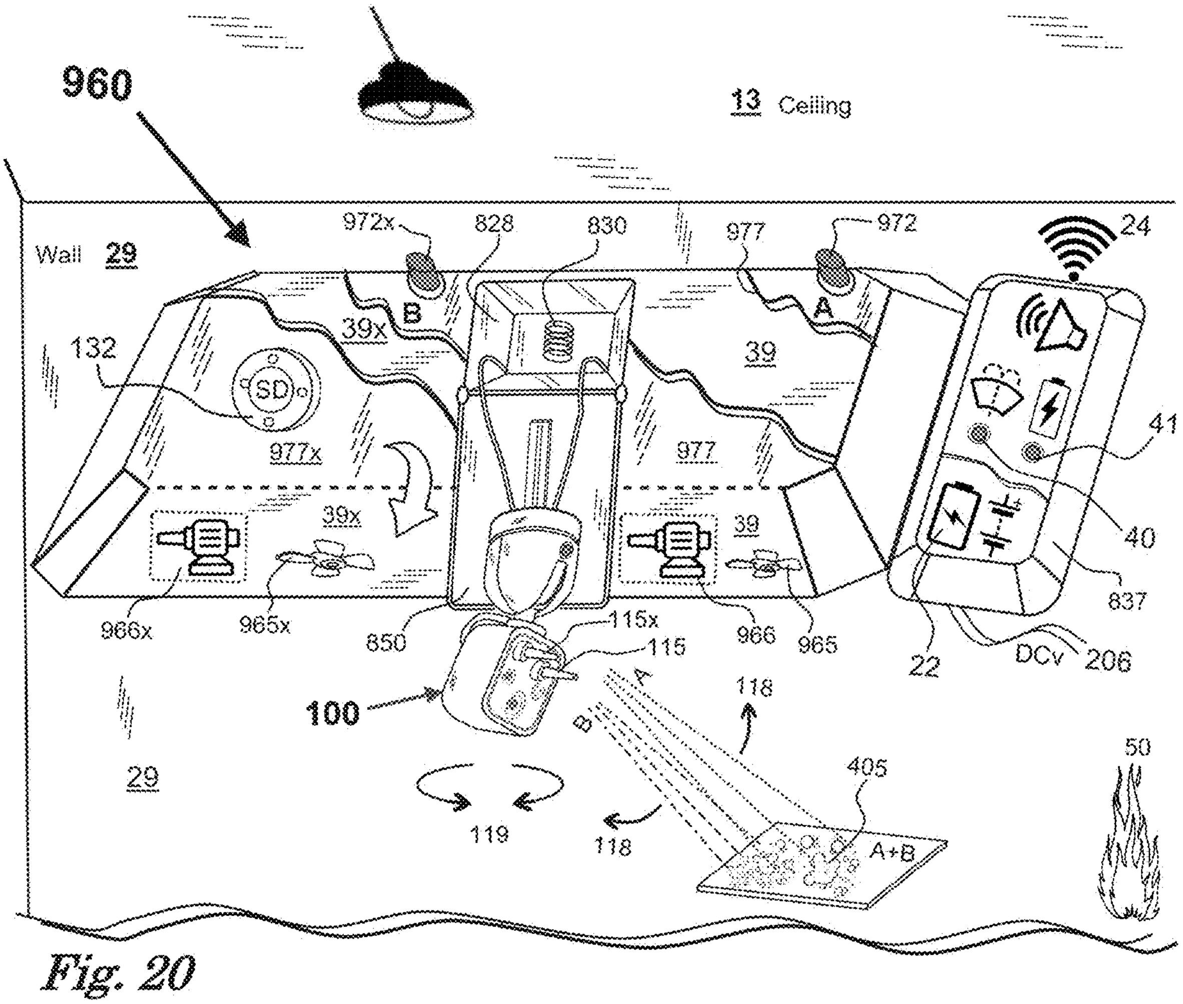
FIG. 20 is a perspective view showing an AI guided fire sprinkler system with dual spray nozzles spraying two dissimilar fire suppressants onto a target in accordance with an embodiment of the present disclosure.

Turning to FIG. 20 is a variant of the system 400 in FIG. 7. The Dual nozzle AI guided fire sprinkler system 960 resembles the system 400 in FIG. 7 includes control panel 837, a dual fire suppressant tank 977 and 977*x*, two suppressant spray pump 966 and 966*x*, two stirring pump 965 and 965*x*, two top-off fluid shutoff valve inside the each tank 977,977*x*, two fill inlet 972 and 972*x* and a smoke and heat detection sensor 132. The AI guidance flame tracking turret fire sprinkler 100 draws two dissimilar fire suppressants "A" 39 and fire suppressant "B" 39*x* through their respective hoses blasting out via fire suppressant spray nozzle 115 and 115*x* landed on target 405 then the two dissimilar fire suppressant 39 and 39*x*, "A+B" self mixed on the target 405 quickly reacting chemically similar to an intumescent reaction preventing combustible gas such oxygen entering the target 405 effectively extinguishing a fire 50.

Figure 21:
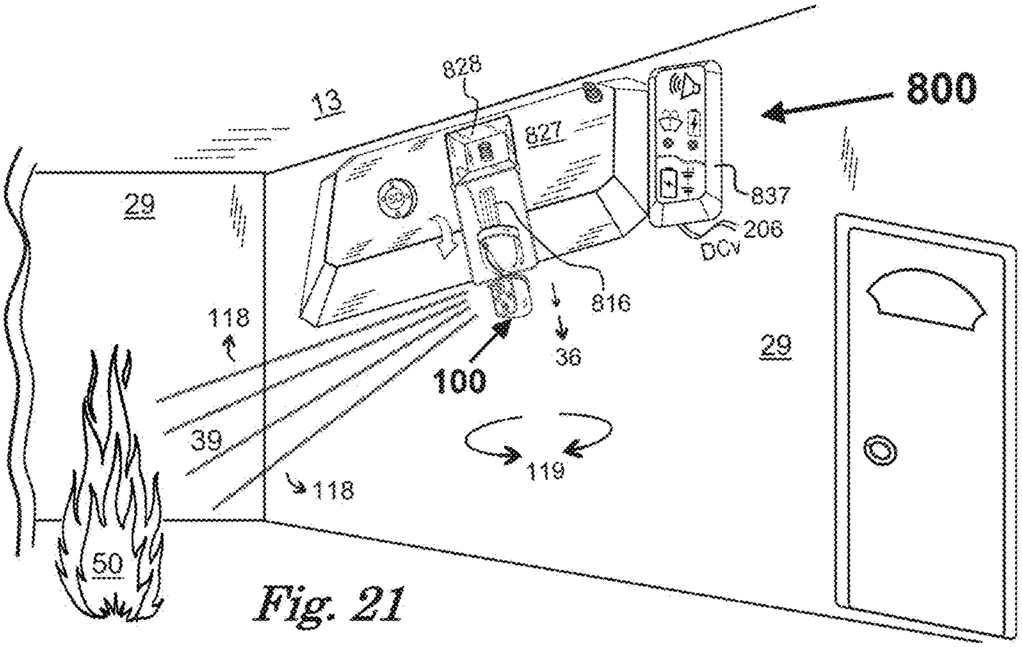
FIG. 21 is a perspective view of a wall mounted AI guided fire sprinkler system spraying fire suppressant while tracking the movement of the flame.

Returning to FIG. 21 is an AI guided fire sprinkler system 800 installed on upper wall 29. The AI guidance flame tracking turret fire sprinkler 100 comprises a turret head assembly 111 which houses a thermal image tracking camera 112, an optical video camera 114, a laser distance measurement sensor 113 and fire suppressant spray nozzle 115. After the turret head assembly 111 cleared the hinged flip door panel 850 the AI guided fire sprinkler system 800 starts fighting a fire 50 in direction 119 and angles 118 guided by its AI guidance flame tracking turret fire sprinkler 100. The AI guided fire sprinkler system 800 size mimics a mini split air conditioner air handler 90 shown on FIG. 4 or an audio sound bar and can be removed and relocated to other room or other building without any plumbing and electrical installation.

The AI guided fire sprinkler system and the central fire sprinkler system maintains the smoke and heat detection sensor power on at all times scouting for fire while placing automated flame tracking turret fire sprinklers in sleep mode and concealing its optical video and thermal image tracking cameras by flip door panels. This keeps the camera lens tucked away so as to be not visible to protect an occupant's privacy and be ready to wake up and response to alert command sent from the smoke and the heat detection sensors.

Upon an alert signal confirmed, illuminating the area with an illuminator via the AI guidance flame tracking turret fire sprinkler scanning the premises with its optical video camera (FPV-First Person View) and thermal image tracking camera and turning on the audio sounder for sending an alert to occupant, or fire department. The method also includes locking on the identified size and temperature of the erupted flame, activating the high pressure fire suppressant spray pump and forcing the liquid fire suppressant through the fire suppressant spray nozzle splashing the flame with liquid fire suppressant such as Polyphosphate, Ammonium Polyphosphate, Sodium Polyphosphate, Mono ammonium phosphate. The method further includes continuing to track and follow the flame movement with the AI guidance flame tracking turret fire sprinkler splashing it with liquid fire suppressant until the fire is extinguished, and based on the smoke and heat detection sensor no longer sending an alert, shutting off the high pressure fire suppressant spray pump and keeping the smoke and heat detection sensors active to assure fire will not reignite.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A fire sprinkler system comprising:

an internal fire suppressant tank with a hinged flip door panel mounted on a wall comprising a fire suppressant spray pump, a smoke and heat detection sensor, a fire suppressant supply hose, a fluid shutoff valve, a stirring pump and a fill inlet, wherein the fire suppressant spray pump is configured to draw a fire suppressant from the internal fire suppressant tank through the fire suppressant supply hose to a fire suppressant spray nozzle;

an AI guidance flame tracking turret fire sprinkler with rollers riding on a set of slide rails anchored on a back side of the hinged flip door panel stowed in a turret recessed niche area of the internal fire suppressant tank against a spring tension and secured with an electro-mechanical release latch wherein the AI guidance flame tracking turret fire sprinkler is free to move in pan and tilt motions and slide downward and clear the hinged flip door panel in a rotated and open position when deployed to fight a fire; and a control panel comprising a rechargeable battery with low battery level warning indicator, a wireless communication device, a low fire suppressant level warning indicator and an audio sounder attached on a front surface of the control panel to provide visual and audio warning to an occupant to maintain the health of the fire sprinkler system to assure readiness for an erupted fire.

2. The fire sprinkler system of claim 1, wherein the AI guidance flame tracking turret fire sprinkler further comprises a turret head assembly, wherein the fire suppressant spray nozzle, a turret pan servo motor, a turret tilt servo motor, an optical video camera, a thermal image tracking camera and a laser distance sensor are housed in the turret head assembly, and wherein movement of the turret head assembly follows a flame movement.

3. The fire sprinkler system of claim 1, further comprising a remotely located external supplemental fire suppressant storage tank comprising a rectangular shaped shell, a built-in fire suppressant top off pump, a fill inlet, a stirring pump, a fluid shutoff valve, and a top off hose attached on an outlet adapter for top off of the internal fire suppressant tank.

4. The fire sprinkler system of claim 1, further comprising a remotely located external supplemental fire suppressant storage tank configured to supply fire suppressant to top off the internal fire suppressant tank.

5. The fire sprinkler system of claim 1, wherein the internal fire suppressant tank fluid shutoff valve shuts off a built-in fire suppressant top off pump in a remotely located external supplemental fire suppressant storage tank based on a fluid pressure in a top off hose exceeding a set pressure limit due to the internal fire suppressant tank being full.

6. The fire sprinkler system of claim 1, wherein the AI guidance flame tracking turret fire sprinkler further comprises enhanced re-purpose face tracking, object tracking computer vision and machine vision and machine learning software and hardware configured to track movement in flame temperature, flame size and flame shape in real time to decide to extinguish a fire before it spreads by directing aqueous fire suppressant precisely on a flame of the fire.

7. The fire sprinkler system of claim 1, wherein the fire suppressant spray pump further comprises a PPM technique (Pulse-Period Modulation) configured to reduce the fire suppressant consumption while maintaining a maximum shooting distance and wherein the PPM technique intermittently switches power on the fire suppressant spray pump for a maximum pressure and a maximum fire suppressant spray duration.

8. The fire sprinkler system of claim 1, wherein the fire suppressant spray pump further switches into a PPM technique to conserve fire suppressant and an extended spray duration during no occupancy and reverts back to normal operating parameters when occupancy is determined.

9. The fire sprinkler system of claim 1, further comprising a vibration damping magnet configured to smooth out pulsing and shaking due to the fire suppressant spray pump cycling intermittently in on-off operation and to stabilize the turret head assembly.

10. The fire sprinkler system of claim 1, further comprising an optical video camera configured to recognize a hand gesture including a five fingers palm signal signifying a "STOP" and de-energize the fire suppressant spray pump in an emergency event, and recognize a three fingers "OK" hand gesture signifying a resume of a fire suppressant spray.

11. The fire sprinkler system of claim 1, further comprising a fire sprinkler self test system configured to share the fire suppressant spray pump, wherein the fire sprinkler self test system comprises: a Tee pipe diverter fitting, a check valve, a fire suppressant inlet hose connected to the Tee pipe diverter fitting, an electric normally closed valve connected to the fire suppressant inlet hose, and a drip catcher tray configured to collect a dispensed fire suppressant during a self test action.

12. The fire sprinkler system of claim 11, wherein the check valve is pre-loaded with a crack pressure to prevent dripping when the fire sprinkler system is not in a deployed position and wherein the check valve cracks open to allow fire suppressant to pass through to the fire suppressant spray nozzle when a fire suppressant pressure is higher than the built-in crack pressure of the check valve.

13. The fire sprinkler system of claim 11, wherein a lower than nominal operating voltage across the fire suppressant spray pump energizes the electric normally closed valve to an open position and effectively blocks the fire suppressant from passing through the check valve to reach the fire suppressant spray nozzle and wherein fire suppressant is continuously forced to return to the internal fire suppressant tank effectively exercising the fire suppressant spray pump.

14. The fire sprinkler system of claim 13, wherein the electric normally closed valve is rapidly intermittently switched on-off causing the check valve to partially open and allowing a minimal flow of fire suppressant to escape and cleanse the fire suppressant spray nozzle and collect spent fire suppressant in the drip catcher tray.

15. The fire sprinkler system of claim 11, wherein the shared fire suppressant spray pump, the Tee pipe diverter fitting, the check valve, the electric normally closed valve and the drip catcher tray are configured to perform a self test of fire fighting without wetting the premises.

* * * * *